(12) United States Patent
Ning et al.

(10) Patent No.: US 11,226,717 B2
(45) Date of Patent: Jan. 18, 2022

(54) USER INTERFACE DISPLAY METHOD AND APPARATUS, DEVICE, AND STORAGE MEDIUM

(71) Applicant: GUANGDONG OPPO MOBILE TELECOMMUNICATIONS CORP., LTD., Guangdong (CN)

(72) Inventors: Mengqi Ning, Guangdong (CN); Xudong Chen, Guangdong (CN); Lan Mi, Guangdong (CN); Song Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/900,986

(22) Filed: Jun. 14, 2020

(65) Prior Publication Data

US 2020/0310627 A1  Oct. 1, 2020

Related U.S. Application Data

(63) Continuation of application No. PCT/CN2018/121250, filed on Dec. 14, 2018.

(30) Foreign Application Priority Data

Dec. 14, 2017 (CN) .......................... 201711342381.1

(51) Int. Cl.
  *G06F 3/0481* (2013.01)
  *G06F 9/451* (2018.01)
  *G06F 3/0488* (2013.01)

(52) U.S. Cl.
  CPC ...... *G06F 3/04817* (2013.01); *G06F 3/04886* (2013.01); *G06F 9/451* (2018.02); *G06F 2203/04803* (2013.01)

(58) Field of Classification Search
  CPC .. G06F 3/04817; G06F 9/451; G06F 3/04886; G06F 2203/04803
  See application file for complete search history.

(56) References Cited

U.S. PATENT DOCUMENTS

2008/0307364 A1* 12/2008 Chaudhri ............ G06F 3/04842
  715/836
2013/0002568 A1* 1/2013 Selim .................... G06F 1/1643
  345/173

(Continued)

FOREIGN PATENT DOCUMENTS

CN 103092494 5/2013
CN 105847467 8/2016

(Continued)

OTHER PUBLICATIONS

WIPO, ISR for PCT/CN2018/121250, Mar. 14, 2019.

(Continued)

*Primary Examiner* — Roberto Borja
(74) *Attorney, Agent, or Firm* — Hodgson Russ LLP

(57) ABSTRACT

A user interface display method, apparatus, and system are provided. The method can include displaying, in a main display region, a first user interface of a first application program; displaying, in a secondary display region, a program icon of a second application program; and when a first operation signal on the program icon is received, displaying a floating window on the first user interface, the floating window being used for displaying a second user interface of the second application program.

15 Claims, 24 Drawing Sheets

(56) References Cited

U.S. PATENT DOCUMENTS

| | | | | |
|---|---|---|---|---|
| 2014/0232671 A1* | 8/2014 | Chaudhri | ................ | G06F 9/451 |
| | | | | 345/173 |
| 2014/0237420 A1* | 8/2014 | Song | ................... | G06F 3/04845 |
| | | | | 715/790 |
| 2016/0124595 A1 | 5/2016 | Kim et al. | | |
| 2017/0031553 A1* | 2/2017 | Gray | ..................... | G06F 3/0484 |
| 2017/0153792 A1 | 6/2017 | Kapoor et al. | | |
| 2018/0052571 A1* | 2/2018 | Seol | ...................... | G06F 3/0488 |
| 2019/0104216 A1* | 4/2019 | Van Hecke | ........... | G06F 3/0482 |
| 2019/0235748 A1* | 8/2019 | Seol | ......................... | H04N 5/93 |
| 2020/0278775 A1* | 9/2020 | Tao | ....................... | G06F 3/0485 |

FOREIGN PATENT DOCUMENTS

| | | |
|---|---|---|
| CN | 106354403 | 1/2017 |
| CN | 106445116 | 2/2017 |
| CN | 106843879 | 6/2017 |
| CN | 107168609 | 9/2017 |
| CN | 107391246 | 11/2017 |
| CN | 108089786 | 5/2018 |
| WO | 2017135749 | 8/2017 |
| WO | WO-2019003519 A1 * | 1/2019 ........... G06F 3/0481 |

OTHER PUBLICATIONS

SIPO, First Office Action for CN Application No. 201711342381.1, dated May 13, 2019.

EPO, Extended European Search Report for EP Application No. 18888387.0, dated Jan. 19, 2021.

IPI, Office Action for IN Application No. 202017029562, dated Aug. 15, 2021.

* cited by examiner

USER INTERFACE DISPLAY METHOD AND APPARATUS, DEVICE, AND STORAGE MEDIUM

CROSS-REFERENCE TO RELATED APPLICATION

This application is a continuation of International Application No. PCT/CN2018/121250, filed Dec. 14, 2018, which claims priority to Chinese Patent Application No. 201711342381.1, filed Dec. 14, 2017, the entire disclosures of which are incorporated herein by reference.

TECHNICAL FIELD

Embodiments of the present disclosure generally relate to man-machine interaction technologies, and more particularly, to a user interface display method and device, apparatus and storage medium.

BACKGROUND

Generally, a smartphone usually has a plurality of application programs installed thereon. When there are multiple application programs running in the background, users can switch one of the application programs to run in the foreground.

In related art, there is proposed an application program switching method which includes the following steps. For example, during running an application program A in the foreground, if a first tap signal on a menu key is received, the smartphone displays a thumbnail page on which thumbnails of several application programs running in the background are displayed; when a second tap signal on the thumbnail corresponding to an application program B is received, the smartphone switches the application program B to the foreground.

SUMMARY

Embodiments of the present disclosure provide a user interface display method and device, apparatus and storage medium, in order to solve the technical problem that the application program switching method in related arts needs a plurality of man-machine interaction operations, and the man-machine interaction efficiency is low.

The technical solutions of the present disclosure are as follows:

According to an aspect, there is provided a user interface display method, including:

displaying a first user interface for a first application program in a main display region;

displaying a program icon of a second application program in an auxiliary display region; and when a first operation signal on the program icon is received, displaying a floating window on the first user interface, wherein the floating window is used to display a second user interface for the second application program.

According to another aspect, there is provided a user interface display device, including:

a first display module configured to display a first user interface for a first application program in a main display region;

a second display module configured to display a program icon of a second application program in an auxiliary display region;

wherein the second display module is further configured to, when a first operation signal on the program icon is received, display a floating window on the first user interface, wherein the floating window is used to display a second user interface for the second application program.

According to another aspect, there is provided a terminal, including a processor and a memory, wherein the memory stores at least one instruction, and the at least one instruction is configured to be executed by the processor to implement the user interface display method according to the first aspect.

According to another aspect, there is provided a computer-readable storage medium having at least one instruction stored thereon, wherein the at least one instruction is configured to be executed by a processor to implement the user interface display method according to the first aspect.

DETAILED DESCRIPTION

To make the objectives, technical solutions, and advantages of the present disclosure clearer, the following describes embodiments of the present disclosure in further detail with reference to the accompanying drawings.

The term "plurality" herein refers to two or more. The term "and/or" describes a relationship of related objects, indicating that there can be three relationships, for example, A and/or B can indicate three conditions: A exists only, both A and B exist, and B exists only. The character "/" generally indicates that the related objects are in an "or" relationship.

Figure 1:
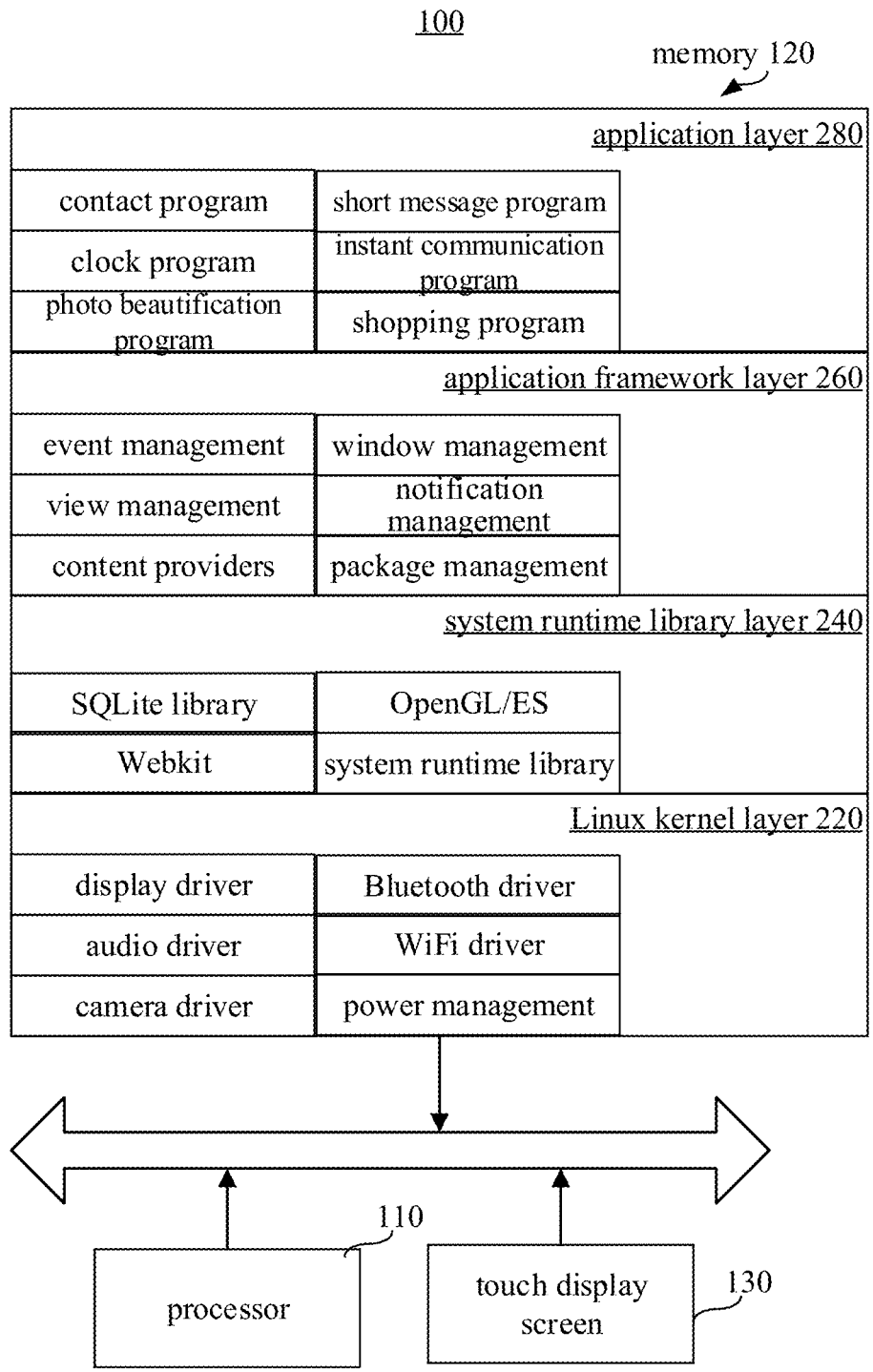
FIG. 1 is a schematic structural diagram of a terminal according to an exemplary embodiment of the present disclosure.
Figure 2:
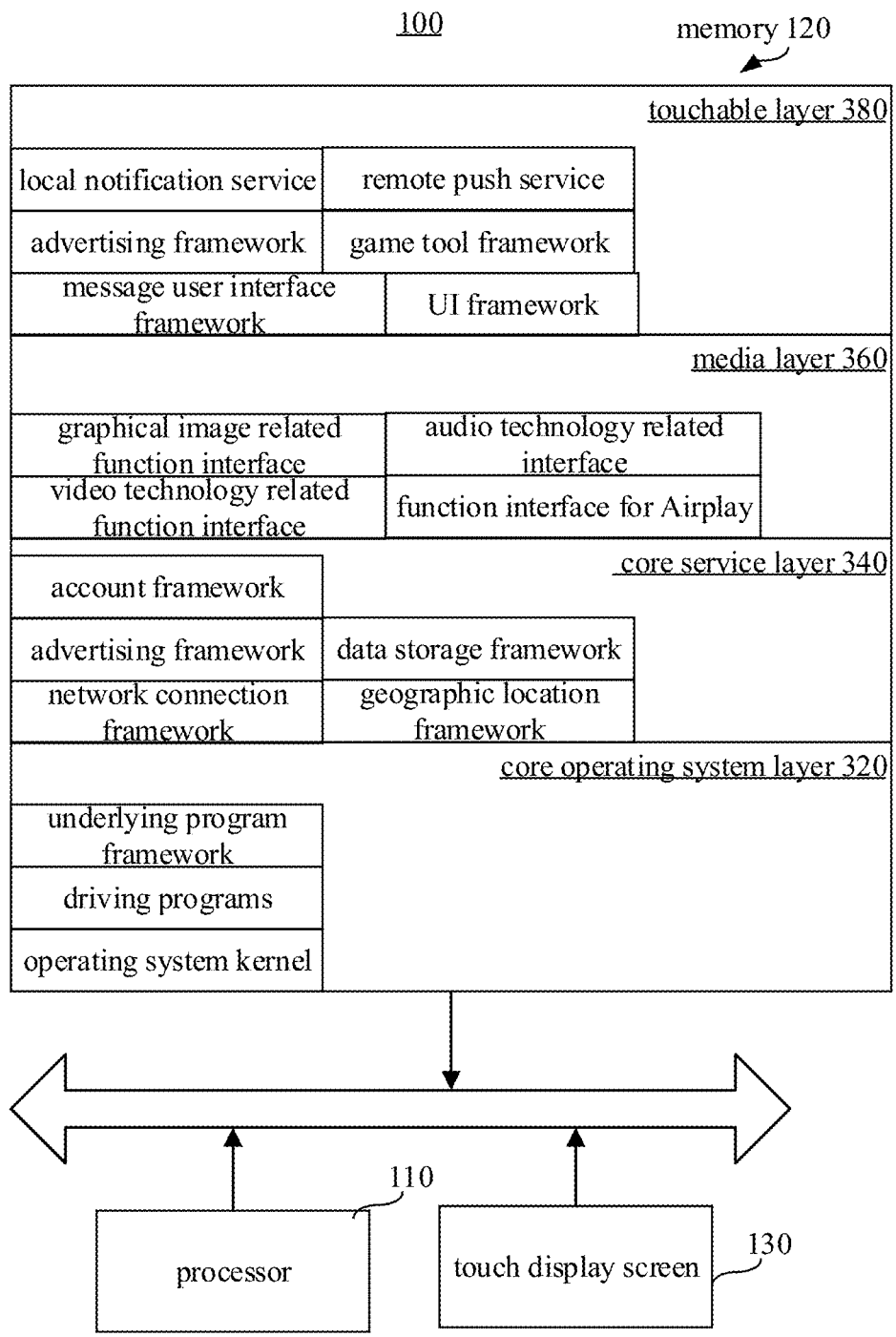
FIG. 2 is a schematic structural diagram of a terminal according to another exemplary embodiment of the present disclosure.

FIG. 1 and FIG. 2 show structural block diagrams of a terminal 100 according to an exemplary embodiment of the present disclosure. The terminal 100 may be a mobile phone, a tablet computer, a notebook computer, an e-book, and so on. The terminal 100 in the present disclosure may include one or more of the following components: a processor 110, a memory 120, and a touch display 130.

The processor 110 may include one or more processing cores. The processor 110 uses various interfaces and lines to connect various parts of the entire terminal 100, and performs functions of the terminal and processes data by running or executing instructions, programs, code sets or instruction sets stored in the memory 120 and calling data stored in the memory 120. According to embodiments, the processor 110 may use at least one hardware form of Digital Signal Processing (DSP), Field-Programmable Gate Array (FPGA), and Programmable Logic Array (PLA). One or a combination of a Central Processing Unit (CPU), a Graphics Processing Unit (GPU), and a modem may be incorporated into the processor 110. The CPU mainly processes the operating system, user interface, application programs, and so on. The GPU is used to render and draw the content that needs to be displayed by touching the display screen 130. The modem is used to handle wireless communications. It can be understood that the above-mentioned modem may not be integrated into the processor 110, and may be implemented by a chip alone.

The memory 120 may include a Random Access Memory (RAM) or a Read-Only Memory. According to embodiments, the memory 120 includes a non-transitory computer-readable storage medium. The memory 120 may be used to store instructions, programs, codes, code sets, or instruction sets. The memory 120 may include a program storage region and a data storage region. The program storage region may store instructions for implementing an operating system, instructions for at least one function (such as a touch function, a sound playback function, an image playback function, etc.), instructions for implementing the following various method embodiments and so on. The data storage region may store data created according to the use of the terminal 100 (such as audio data, phone book), and so on.

For example, the operating system of the terminal is the Android operating system. The programs and data stored in the memory 120 are shown in FIG. 1. The memory 120 stores a Linux kernel layer 220, a system runtime library layer 240, an application framework layer 260, and an application program layer 280. The Linux kernel layer 220 provides underlying drivers for various hardware of the terminal 100, such as display drivers, audio drivers, camera drivers, Bluetooth drivers, Wi-Fi drivers, and power management. The system runtime library layer 240 provides major feature support for the Android system through some C/C++ libraries. For example, the SQLite library provides database support, the OpenGL/ES library provides 3D drawing support, and the Webkit library provides browser kernel support. The system runtime library layer 240 also provides Android runtime library 242, which mainly provides some core libraries to allow developers to write Android application programs using the Java language. The application framework layer 260 provides various APIs that may be used when building application programs, and developers can also use these APIs to build their own application programs, such as event management, window management, view management, notification management, content providers, package management, call management, resource management, positioning management. At least one application program runs in the application layer 280, and these application programs may include a contact program, a short message program, a clock program, a camera application program that are provided by the operating system; or may include application programs developed by a third-party developer, such as instant communication programs, photo beautification programs, and so on.

As another example, the operating system of a terminal may be the iOS system. The programs and data stored in the memory 120 are shown in FIG. 2. The iOS system includes: a core operating system layer 320, a core service layer 340, a media layer 360, a touchable layer (Cocoa Touch Layer) 380. The core operating system layer 320 includes an operating system kernel, driving programs, and underlying program frameworks. These underlying program frameworks provide functions closer to hardware for use by the program framework at the core service layer 340. The core service layer 340 provides system services and/or program frameworks required by application programs, such as foundation framework, account framework, advertising framework, data storage framework, network connection framework, geographic location framework, move framework, and so on. The media layer 360 provides audiovisual interfaces for application programs, such as graphics and image related interfaces, audio technology related interfaces, video technology related interfaces, and audio and video transmission technology wireless playback (AirPlay) interfaces. The touchable layer 380 provides various commonly used interface-related frameworks for application program development. The touchable layer 380 is responsible for user's touch interaction operations on the terminal 100. For example, local notification services, remote push service, advertising framework, game tool framework, message user interface (User Interface, UI) framework, user interface UIKit framework, map framework, and so on.

In the framework shown in FIG. 2, frameworks related to most application programs include, but are not limited to: the basic framework in the core service layer 340 and the UIKit framework in the touchable layer 380. The basic framework provides many basic object classes and data types to provide the most basic system services for all application programs, regardless of the UI. The classes provided by the UIKit framework are basic UI class libraries for creating touch-based user interfaces. The iOS application programs can provide UI based on the UIKit framework, so it provides the basic architecture of the application programs for building user interfaces, drawing, processing and user interaction events, responding to gestures, and so on.

The touch display screen 130 is used to receive a user's touch operation on or near the touch display screen 130 using any suitable object such as a finger, a touch pen, and the like, and display user interfaces for various application programs. The touch display screen 130 is usually provided on the front panel of the terminal 130. The touch display 130 may be designed as a full screen, a curved screen, or an anomalous screen. The touch display screen 130 can also be designed as a combination of a full screen and a curved screen, and a combination of an anomalous screen and a curved screen, which is not limited in embodiments of the present disclosure.

Figure 3:
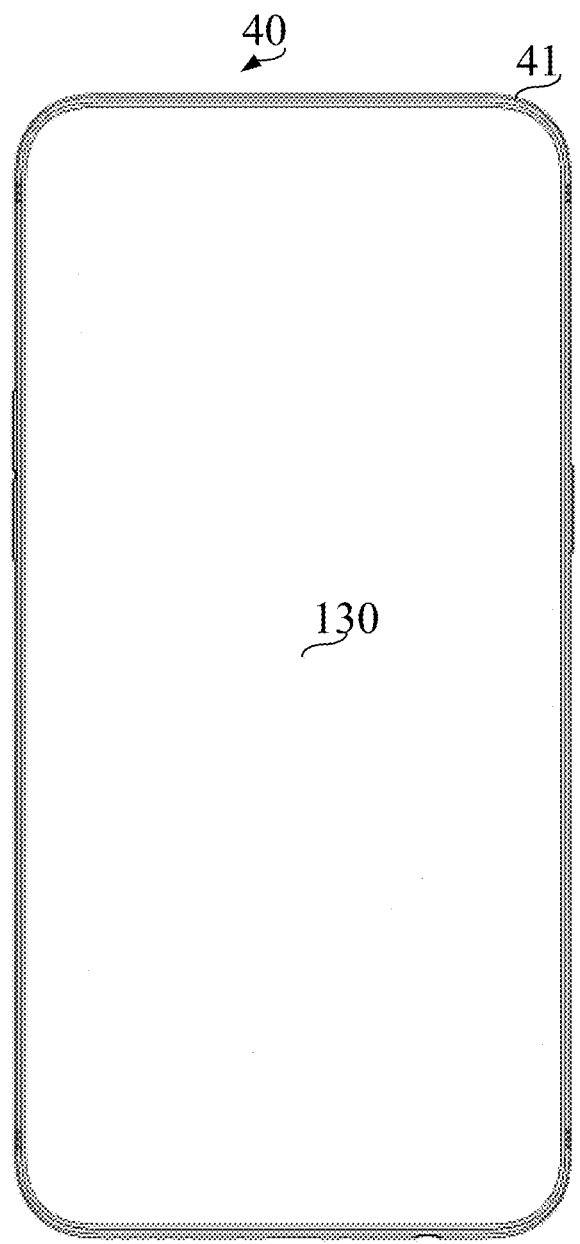
FIGS. 3 to 8 are schematic diagrams showing appearances of terminals with different touch display screens according to exemplary embodiments of the present disclosure.

Full Screen:

A full screen may refer to a screen design in which the touch screen 130 occupies the front panel of the terminal 100 with a screen-to-body ratio exceeding a threshold (such as 80%, 90%, or 95%). One method for calculating the screen-to-body ratio is: (the area of the touch screen 130/the area of the front panel of the terminal 100)*100%. Another method for calculating the screen-to-body ratio is: (the area of the actual display region in the touch screen 130/the area of the front panel of the terminal 100)*100%. A further method for calculating the screen-to-body ratio is: (diagonal line of the touch screen 130/diagonal line of the front panel of the terminal 100)*100%. In the example shown in FIG. 3, almost all regions on the front panel of the terminal 100 are occupied by touch display screen 130. On the front panel 40 of the terminal 100, other regions than the edges generated by the middle frame 41 are all occupied by the touch screen 130. The four corners of the touch display 130 may be right angles or rounded corners.

The full screen may also be a screen design that integrates at least one kind of front panel component inside or below the touch display screen 130. According to embodiments, the at least one kind of front panel component includes: a camera, a fingerprint sensor, a proximity light sensor, a distance sensor, and the like. In some embodiments, other components on the front panel of the conventional terminal are integrated in all or part of the regions of the touch display 130. For example, after photosensitive elements in the camera are split into multiple photosensitive pixels, each photosensitive pixel is integrated in a black area in each display pixel in the touch display 130. Since at least one front panel component is integrated inside the touch display screen 130, the full screen has a high screen-to-body ratio.

In some other embodiments, the front panel components on the front panel of the conventional terminal may also be disposed on the side or back of the terminal 100. For example, an ultrasonic fingerprint sensor may be disposed below the touch display screen 130, and a bone conduction type earpiece may be installed inside the terminal 130, and a camera may be installed on the side of the terminal as a pluggable structure.

In some optional embodiments, when the terminal 100 adopts a full screen, a single side of the middle frame of the terminal 100, or two sides (such as left and right sides) or four sides (such as upper, lower, left, and right sides) of the terminal are provided with an edge touch sensor 120, which is used to detect the at least one of the following user's operations: touch operation, click or tap operation, press operation and sliding operation on the middle frame. The edge touch sensor 120 may be any one of a touch sensor, a thermal sensor, and a pressure sensor. The user can apply an operation on the edge touch sensor 120 to control the application programs in the terminal 100.

Figure 4:
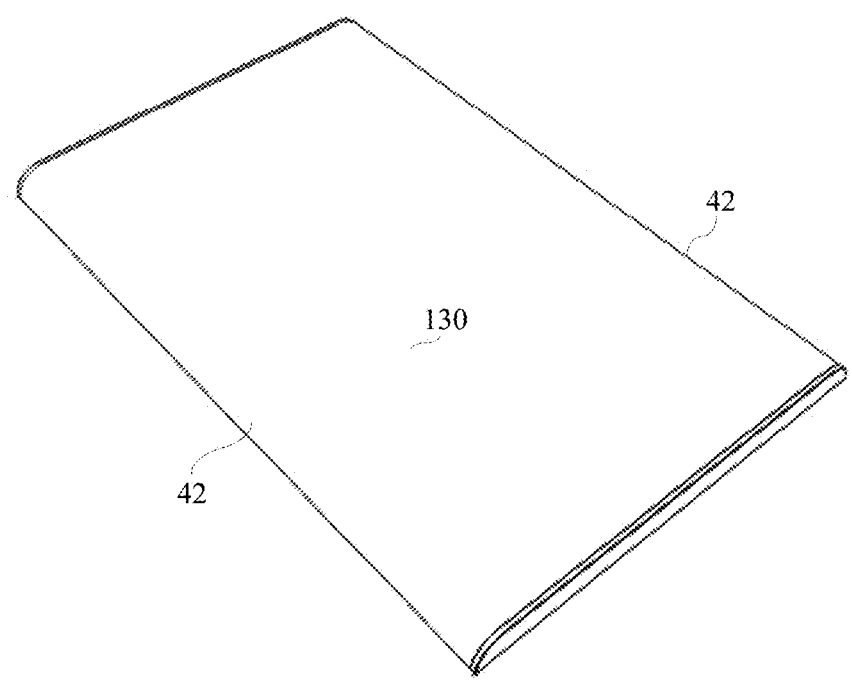

Curved Screen:

A curved screen refers to a screen design in which the cross section of the touch display screen 130 has a curved shape and the projection in the direction parallel to the cross section is a plane. The curved shape may be a U-shape. According to embodiments, a curved screen refers to a screen design in which at least one side is curved. According to embodiments, the curved screen means that at least one side of the touch display 130 extends to cover the middle frame of the terminal 100. Since the side of the touch display 130 extends to cover the middle frame of the terminal 100, that is, the middle frame that does not have the display function and the touch function is covered as a displayable area and/or an operable area, so that the curved screen has a high screen-to-body ratio. In the example shown in FIG. 4, the curved screen refers to a screen design in which the left and right sides 42 are curved; or, the curved screen refers to a screen design in which the upper and lower sides are curved; or, the curved screen refers to a screen design with curved sides on the top, bottom, left, and right sides. In an alternative embodiment, the curved screen is made of a touch screen material with certain flexibility.

Anomalous Screen:

The anomalous screen is a touch screen with an irregular shape, and the irregular shape is not rectangular or rounded rectangle. According to embodiments, the anomalous screen refers to a screen design in which protrusions, notches, and/or holes are provided on the rectangular or rounded rectangular touch display screen 130. According to embodiments, the protrusions, notches, and/or holes may be located at the edges of the touch display screen 130, at the center of the screen, or both. When the protrusions, notches and/or holes are arranged at one edge, they can be arranged at the middle or both ends of the edge; when the protrusions, notches and/or holes are arranged at the center of the screen, they can be arranged at one or more of the upper area, the upper left area, the left area, the lower left area, the lower area, the lower right area, the right area, and the upper right area of the screen. When the protrusions, notches and/or holes are arranged in multiple areas, the protrusions, notches, and holes can be distributed in a concentrated manner or in a distributed manner; they can be distributed symmetrically or asymmetrically. According to embodiments, the number of the protrusions, notches, and/or holes is not limited.

Since the anomalous screen covers the upper forehead area and/or the lower jaw area of the touch display screen as a displayable area and/or an operable area, the touch display screen occupies more space on the front panel of the terminal, and thus the anomalous screen also has high screen-to-body ratio. In some embodiments, the notches and/or holes are used to accommodate at least one front panel component, the front panel component includes at least one of a camera, a fingerprint sensor, a proximity light sensor, a distance sensor, an earpiece, an ambient light brightness sensor, and a physical key.

Figure 5:
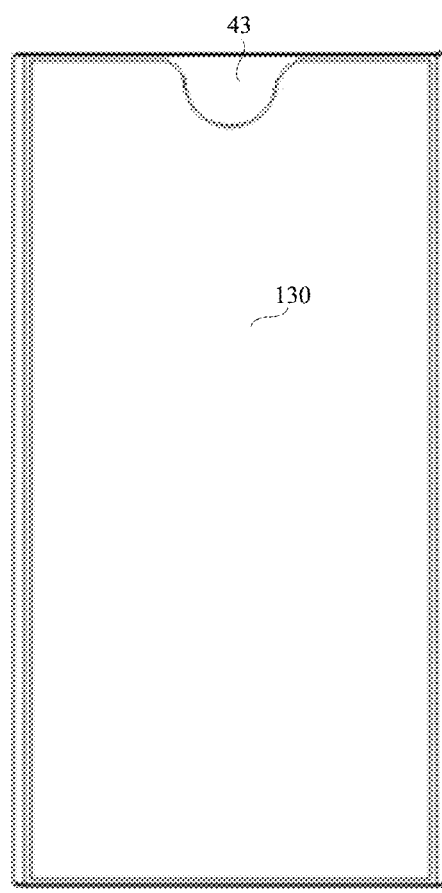
Figure 6:
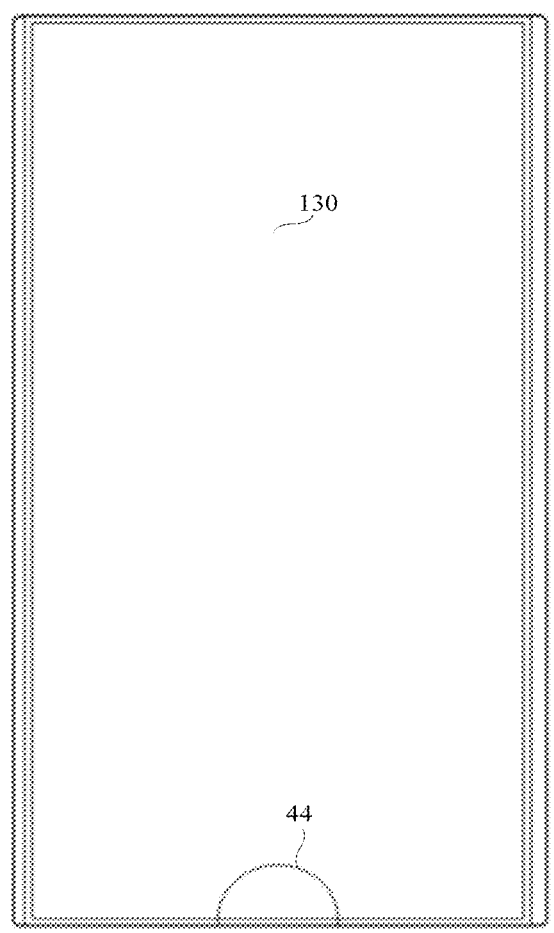
Figure 7:
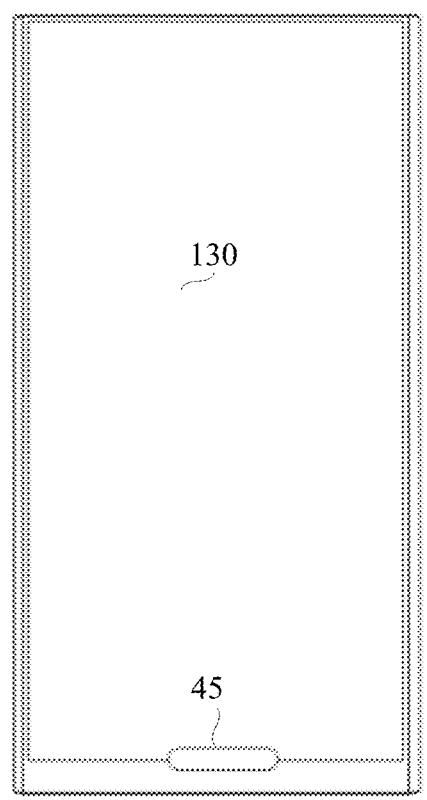
Figure 8:
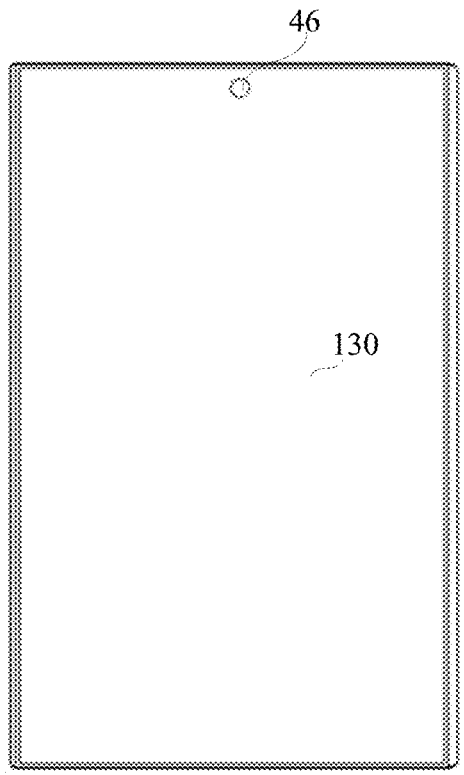

As an example, the notch(es) may be provided on one or more edges, and the notch(s) may be a semi-circular notch, a right-angle rectangular notch, a rounded rectangular notch, or an irregular-shaped notch. In the example shown in FIG. 5, the anomalous screen may be a screen design in which a semi-circular notch 43 is provided at the center of the upper edge of the touch screen 130, and the position vacated by the semi-circular notch 43 is used for accommodating at least one front panel component, such as a camera, a distance sensor (also called a proximity sensor), an earpiece, and an ambient light brightness sensor. As shown in FIG. 6, the anomalous screen may be a screen design in which a semi-circular notch 44 is provided at the central position of the lower edge of the touch screen 130. The position vacated by the semi-circular notch 44 is used to accommodate at least one of a physical key, a fingerprint sensor, and a microphone. As shown in FIG. 7, the anomalous screen may be a screen design in which a semi-oval notch 45 is provided at the center of the lower edge of the touch display 130, and a semi-oval notch is formed on the front panel of the terminal 100. The two semi-oval notches form an elliptical area, which is used to accommodate physical buttons or fingerprint identification modules. In the example shown in FIG. 8, the anomalous screen is a screen design in which at least one small hole 46 is provided at upper half of the display screen 130. The position vacated by the small hole 46 is used to accommodate at least one front panel component, such as a camera, a distance sensor, an earpiece, and an ambient light brightness sensor.

In addition, those skilled in the art may understand that the structures of the terminal 100 shown in the above drawings ds not constitute a limitation on the terminal 100, and the terminal may include more or fewer components than the illustrated ones, or some f the components can be combined, or the terminal may have arraignments different than that shown in the drawings. For example, the terminal 100 may further include components such as a radio frequency circuit, an input unit, a sensor, an audio circuit, a Wireless Fidelity (WiFi) module, a power supply, and a Bluetooth module, which will not be described in detail here.

In some embodiments, the terminal refers to a mobile terminal, such as a smartphone, a tablet computer, or ultra-book. According to embodiments, the mobile terminal is a portable terminal installed with a mobile operating system. The mobile operating system is also called a mobile terminal operating system or a smartphone operating system. The mobile operating system is a concept relative to the desktop operating system. The original design of the mobile operating system is to use it on a small-sized portable terminal. For example, considering the small size of the display screen of the portable terminal, in other modes than the split screen mode, the display screen usually displays only the user interface for an application program. In another example, except for the transient floating window display of the notification message, there is basically no interface design in which multiple user interfaces overlap each other. For another example, considering the touch screen operation characteristics of the portable terminal, the human-computer interaction methods in the mobile operating system mostly use touch operation.

As an example, mobile operating systems include: Android operating system, iOS operating system, Blackberry, and so on. Embodiments of the present disclosure will be describe using the Android operating system as an example.

Figure 9:
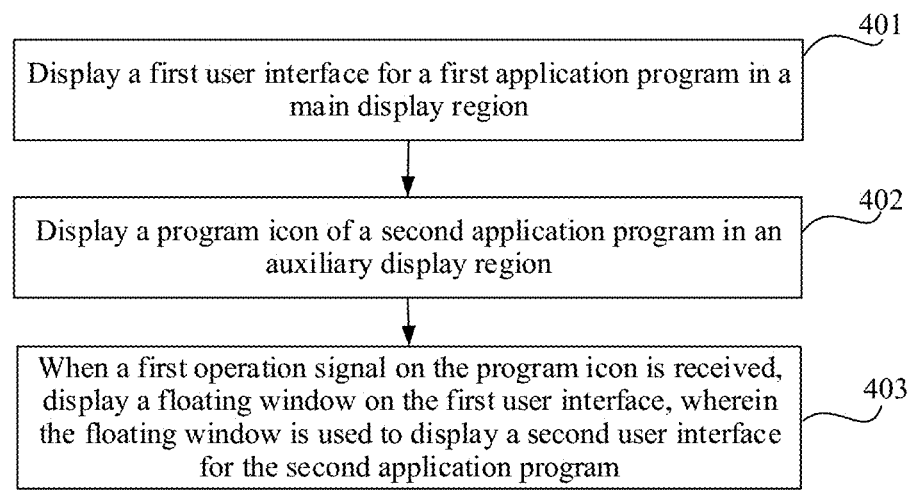
FIG. 9 is a flowchart of a user interface display method according to an exemplary embodiment of the present disclosure.

FIG. 9 shows a flowchart of a user interface display method according to an exemplary embodiment of the present disclosure. For example, the method may be applied to the terminal 100. The method includes the following steps:

In step 401, a first user interface for a first application program is displayed in a main display region.

The display screen of the terminal includes a main display region and an auxiliary display region. Generally, the main display region and the auxiliary display region are different display regions on the same display screen. The first display area (i.e., the amount of the flat space the main display region covers) of the main display region is larger than the second display area (i.e., the amount of the flat space the auxiliary display region covers) of the auxiliary display region.

According to embodiments, the main display region is adjacent to the auxiliary display region, and the total display region of the main display region and the auxiliary display region is equal to the available display region of the display screen. According to embodiments, the auxiliary display region is a region for displaying auxiliary information, rather than a region mainly used for human-machine interaction. The auxiliary information includes at least one of time information, operator information, signal strength information, wireless function on state, battery power information, and volume information.

When the display screen is an anomalous screen, the main display region is a rectangular display region on the anomalous screen, and the auxiliary display region is an anomalous display region on the anomalous screen. The combination of the main display region and the auxiliary display region is the entire display region of the anomalous screen. As an example, three sides of the anomalous screen are straight sides, and the remaining side is a curved side with a concave part. The main display region is a region where the largest rectangle in the region formed by the three straight sides and the edges of the concave part. The auxiliary display region is other parts than the main display region. According to embodiments, there may be one or two auxiliary display regions.

When the display screen is a rectangular screen (including a rounded rectangular screen), the main display region may be a rectangular display region, and the auxiliary display region may be a bar-shaped region at one side, such as a region for displaying a status bar or a navigation bar. When the display screen is a curved screen, the main display region may be a flat display region, and the auxiliary display region may be a curved display region located at the side. The embodiments of the present disclosure do not limit the positions of the main display region and the auxiliary display region.

The first application program is an application program running in the foreground. During the usage of the first application program by the user, the terminal displays the first user interface for the first application program on the main display region. The first user interface refers to the program interface for the first application program.

In step 402, a program icon of a second application program is displayed in an auxiliary display region.

The terminal may display the program icon of the second application program in the auxiliary display region in advance, or may display the program icon of the second application program in the auxiliary display region when the terminal is in the landscape mode, or may display the program icon of the second application program according to a received operation signal. Embodiments of the present disclosure do not impose specific limitations on the display timing of the program icon of the second application program.

When the display area of the auxiliary display region is limited, the auxiliary display region may display only one program icon of the second application program. When there is free region in the auxiliary display region, the auxiliary display region may display program icons of other programs, such as a third application program, a fourth application program, and so on. The second application program may be an application program that has not been started, or an application program in a background running state. Embodiments of the present disclosure do not limit the running state of the second application program.

In step 403, when a first operation signal on the program icon is received, a floating window is displayed on the first user interface. The floating window is used to display a second user interface for the second application program.

The first operation signal may be at least one of a tap or click signal, a double-tap or double click signal, a long-press signal, and a sliding signal.

Figure 10:
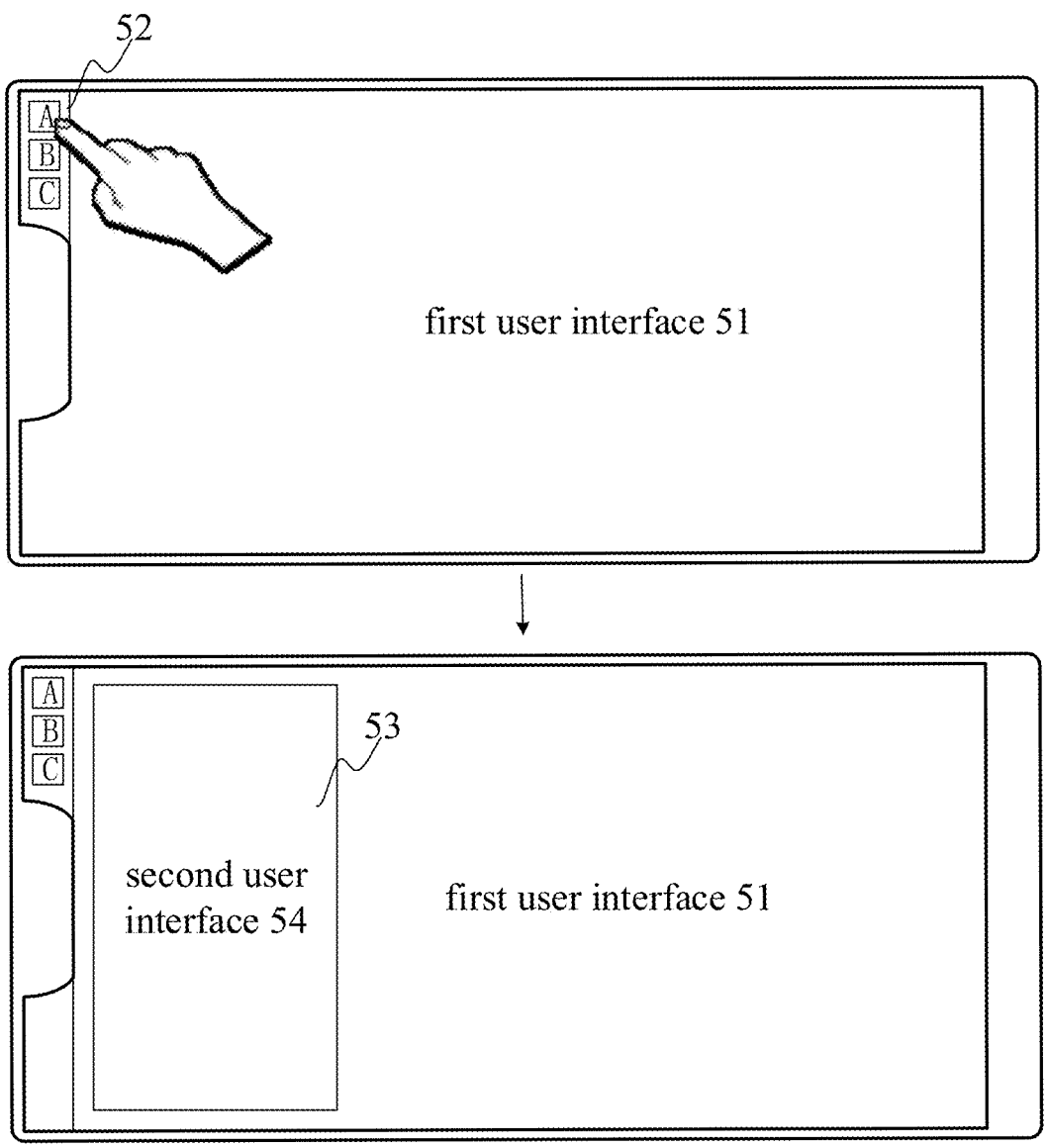
FIG. 10 is a schematic diagram showing an interface when a user interface display method according to an exemplary embodiment of the present disclosure is implemented.

In the following description, for example, the first operation signal is a tap signal. Referring to FIG. 10, the terminal displays a first user interface 51 on the main display region, and displays program icons of second application programs A, B, and C in the auxiliary display region 52. When the terminal receives the tap signal on the program icon of the second application program A, a floating window 53 is superimposed (or popped up) on the first user interface 51. The floating window 53 is used to display the second user interface for the second application program A.

In view of the above, in the user interface display method according to embodiments of the present disclosure, the program icon of the second application program is displayed in the auxiliary display region, and when the first operation signal on the program icon is received, a floating window is displayed on the first user interface. The floating window is used to display the second user interface for the second application program. The method according embodiments of the present disclosure can simplify the operation steps when the user switches between different application programs, and improve the efficiency of human-machine interaction. Also, the method according embodiments of the present disclosure does not interrupt the user's ongoing use of the first application program. For example, if the first application program is a game application program, it is convenient for the user to quickly operate the second application program without interrupting the game experience.

Figure 11:
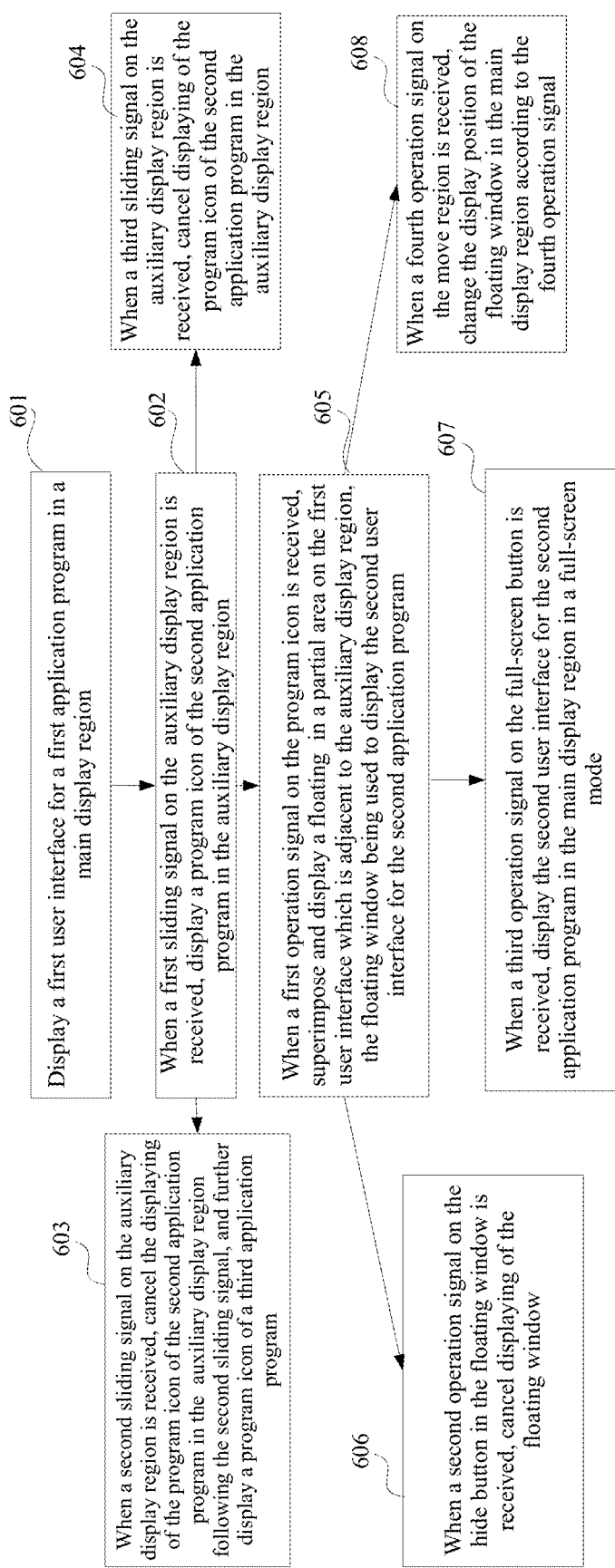
FIG. 11 is a flowchart of a user interface display method according to an exemplary embodiment of the present disclosure.

FIG. 11 shows a flowchart of a user interface display method according to an exemplary embodiment of the present disclosure. In the embodiment, for example, the method is applied to the terminal 100 with an anomalous screen. The method includes the following steps:

In step 601, a first user interface for a first application program is displayed in a main display region.

The display screen of the terminal includes a main display region and an auxiliary display region. When the display screen is an anomalous screen, the main display region is a rectangular display region on the anomalous screen, and the auxiliary display region is an anomalous display region on the anomalous screen. For example, the three sides of the anomalous screen are straight sides, and the remaining side is a curved side with a concave part. The main display region is a region where the largest rectangle in the region formed by the three straight sides and the edges of the concave part. The auxiliary display region is other parts than the main display region. In this embodiment, there are two auxiliary display regions: a first auxiliary display region located on the right side of the terminal, and a second auxiliary display region located on the left side of the terminal. Of course, the first auxiliary display region and the second auxiliary display region can also be regarded as a whole and treated as one auxiliary display region.

In order to simplify the description, the first auxiliary display region is used as an example for illustration, but the following implementation is also applicable to the second auxiliary display region.

The first application program is an application program running in the foreground. During usage of the first application program by the user, the terminal displays the first user interface for the first application program in the main display region. The first user interface refers to the program interface for the first application program.

In the initial state, if the terminal is in the portrait display state, the status bar information may be displayed on the first auxiliary display region. The status bar information includes at least one of operator name, signal strength, network format, time, date, battery power, Wireless Fidelity (WiFi) network information, and Bluetooth information. If the terminal is in a landscape display state, the first auxiliary display region may not display any content, or display a fixed-color (such as black) background, or display content matching the first application program.

In step 602, when a first sliding signal on the first auxiliary display region is received, a program icon of the second application program is displayed on the first auxiliary display region.

The first auxiliary display region includes a first long side, a first short side, a second long side, and a second short side which are connected in sequence. According to embodiments, the first long side and the second long side are parallel straight sides, and the first short side and the second short side may be straight sides or curved sides. The distance between the first long side and the main display region is greater than the distance between the second long side and the main display region. For example, the distance between the first long side and the main display region is 30 pixels, and the distance between the second long side and the main display region is 0 pixels.

According to embodiments, the first sliding signal is a signal indicating a sliding operation from the first long side to the second long side.

When the terminal receives the first sliding signal on the first auxiliary display region, the terminal switches the initial display content on the first auxiliary display region to the program icon of the second application program and displays the program icon of the second application program.

According to embodiments, the second application program and the first application program are different application programs. If the second application program is an application program having a message receiving function, a badge may be displayed on the program icon of the second application program, and the badge is used to indicate that there is an unread message associated with the second application program. For example, the second application program is any one of a short message program, a mail application program, an instant communication program, a microblog program, and a voice communication program.

Figure 12:
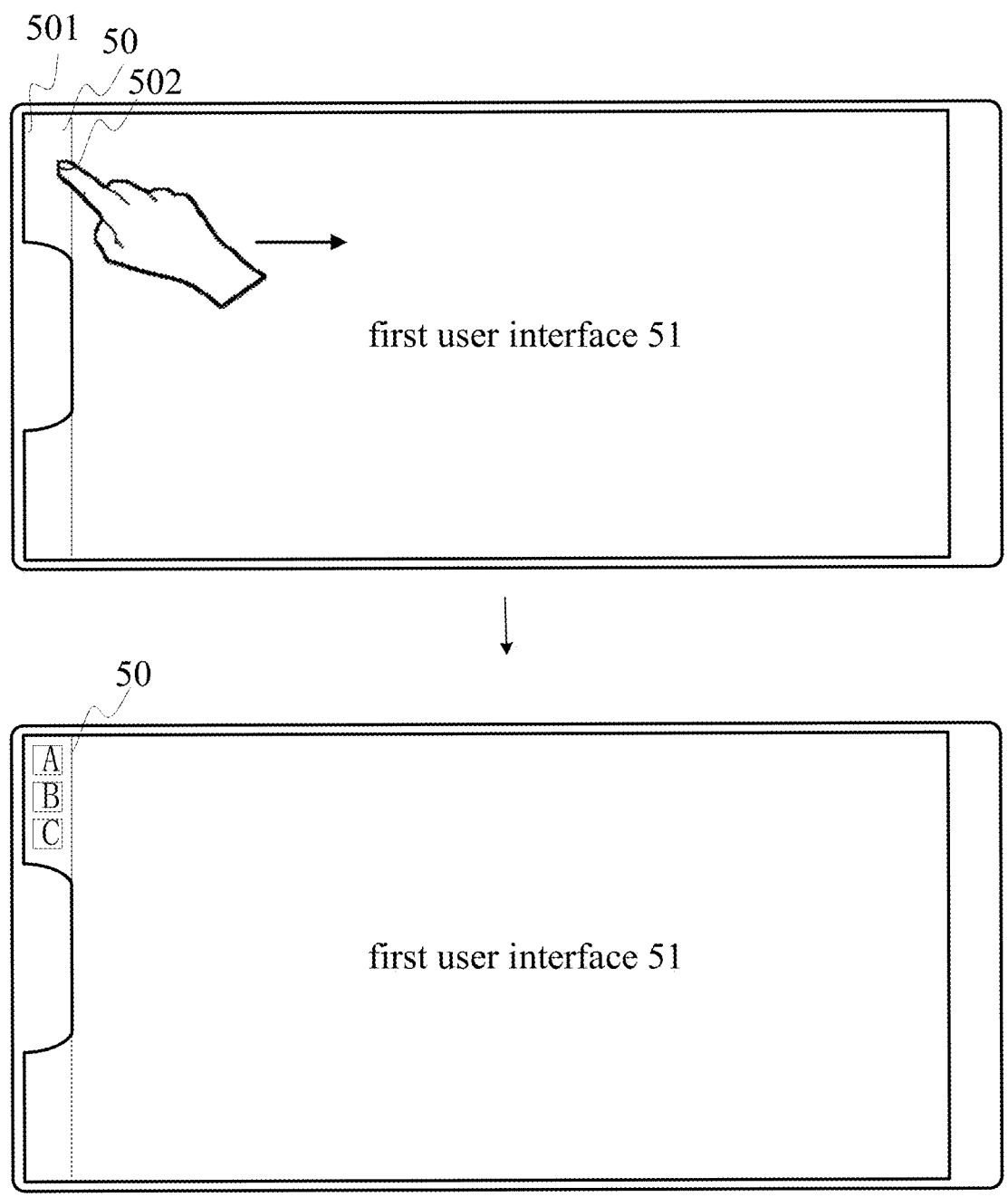
FIGS. 12 to 18 are schematic diagrams showing interfaces during the implementation of the user interface display method according to the embodiment in FIG. 11.

Referring to FIG. 12, when the terminal receives the first sliding signal on the first auxiliary display region 50, the terminal displays the application program icons of the application program A, the application program B, and the application program C in the first auxiliary display region 50. For example, in this embodiment, the application program B is the second application program. The first sliding signal is a signal that indicates a sliding operation from the first long side 501 of the first auxiliary display region 50 to the second long side 502.

In an exemplary embodiment, the terminal displays the program icon of the second application program in the first auxiliary display region when the terminal receives the first sliding signal on the first auxiliary display region and the body state is in the landscape state. As an example, the terminal may only respond to the first sliding signal under the landscape display mode, and not respond to the first sliding signal in the portrait display mode. For example, when the terminal receives the first sliding signal on the first auxiliary display region, the terminal detects whether the body state is the landscape state; if the body state is the landscape state, the program icon of the second application program is displayed in the first auxiliary display region; otherwise, the terminal does not respond to the first sliding signal, or responds to the first sliding signal in other ways, which may be to pop up a pull-down notification bar. For another example, when the body of the terminal is in a portrait state, the signal receiving function of the first auxiliary display region is turned off; when the body of terminal is in the landscape state, the signal receiving function of the first auxiliary display region is enabled, and when the first sliding display signal is received in the first auxiliary display region, the program icon of the second application program is displayed in the first auxiliary display region.

In step 603, when a second sliding signal on the first auxiliary display region is received, the displaying of the program icon of the second application program in the first auxiliary display region is canceled following the second sliding signal, and a program icon of a third application program is further displayed in the first auxiliary display region.

The second sliding signal may be a signal indicating sliding from the first short side to the second short side, or the second sliding signal may be a signal indicating sliding from the second short side to the first short side.

Since the display area of the first auxiliary display region is limited, the terminal may first display the program icon of the second application program in the first auxiliary display region. When receiving the user's second sliding signal on the first auxiliary display region, following the second sliding signal, the terminal may cancel the displaying of the program icon of the second application program in the first auxiliary display region, and may display the program icon of the third application program in the first auxiliary display region.

That is, the terminal will follow the second sliding signal to display the application programs in the first auxiliary display region in a scroll manner. The scroll displaying includes: canceling the displaying of the program icon that is moved out of the first auxiliary display region, displaying the program icon that is moved into the first auxiliary display region, and changing the display positions of the program icons that are still in the first auxiliary display region following the second sliding signal.

Figure 13:
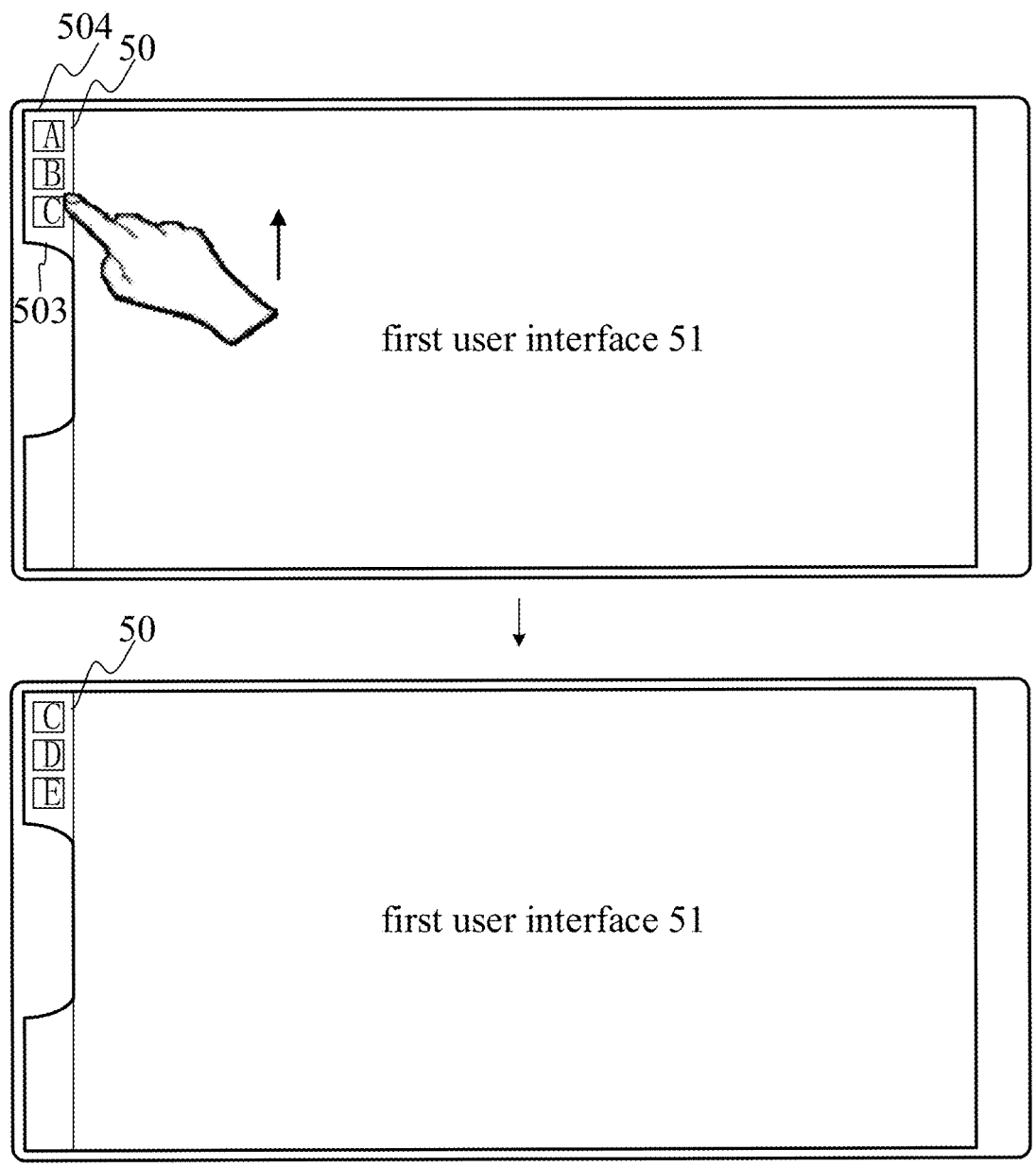

Referring to FIG. 13, when the terminal receives a second sliding signal on the first auxiliary display region 50 (slides from the left side to the right side of the terminal), the terminal moves the application program A and the second application program B out of the second sliding signal The first auxiliary display region 50 and moves the third application program D and the fourth application program E into the first auxiliary display region 50, following the second sliding signal.

In step 604, when a third sliding signal on the first auxiliary display region is received, displaying of the program icon of the second application program in the first auxiliary display region is canceled.

According to embodiments, the third sliding signal is a signal indicating sliding from the second long side to the first long side of the first auxiliary display region.

When the terminal receives the third sliding signal on the first auxiliary display region, the terminal switches from displaying the program icon of the second application program in the first auxiliary display region to displaying the initial display content, or displaying no content.

Figure 14:
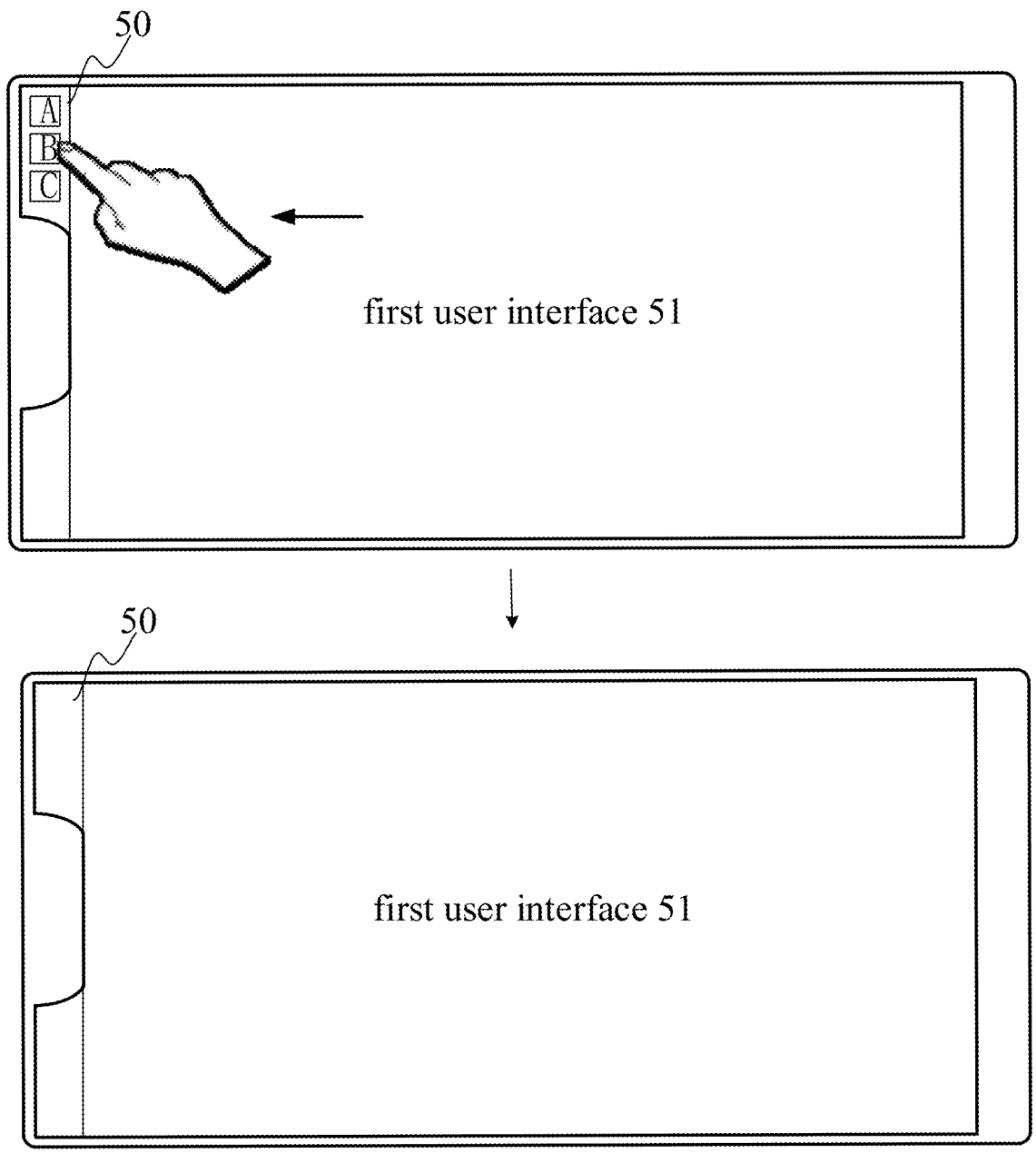

Referring to FIG. 14, when the terminal receives a third sliding signal (slides from the bottom to the top of the terminal) on the first auxiliary display region 50, the terminal switches from displaying the program icons of the application program A, the second application program B and the third application program C in the first auxiliary display region 50 to displaying nothing.

The above steps 603 and 604 are optional steps. After step 602, according to the actual operation applied by the user to the terminal, the embodiment may further include the following steps.

In step 605, when a first operation signal on the program icon of the second application program is received, a floating window is superimposed and displayed in a partial area on the first user interface. The floating window is used to display the second user interface for the second application program.

If the user needs to use the second application program, the user taps the program icon of the second application program in the first auxiliary display region. The terminal receives the first operation signal on the program icon. According to embodiments, the first operation signal is any one of a click or tap signal, a double-click or double-tap signal, and a long-press signal. In the example, the first operation signal is a tap signal.

The terminal may superimpose and display a floating window on a partial area of the first user interface. The second user interface for the second application program is displayed in the floating window. The partial area may be an area adjacent to the first auxiliary display region, that is, the distance between the partial area and the first auxiliary display region is smaller than a threshold. When the second application program is an unstarted application program, the terminal starts the second application program according to the first operation signal, and then displays the second user interface for the second application program in the floating window; when the second application program is running in the background, the terminal switches the application program running in the background to the floating window to enable the application program running in the background to be displayed in the floating window.

The floating window is also known as top-level window or picture-in-picture window, and can be implemented by the Windows Manager in the Android operating system. The floating window may not block the main display element on the first user interface. The user can operate the second user interface in the floating window to control the operation of the second application program.

According to embodiments, when the terminal receives a drag signal on the border or corner of the floating window, the terminal changes any one of the length, width, and display ratio of the floating window according to the drag signal.

Figure 15:
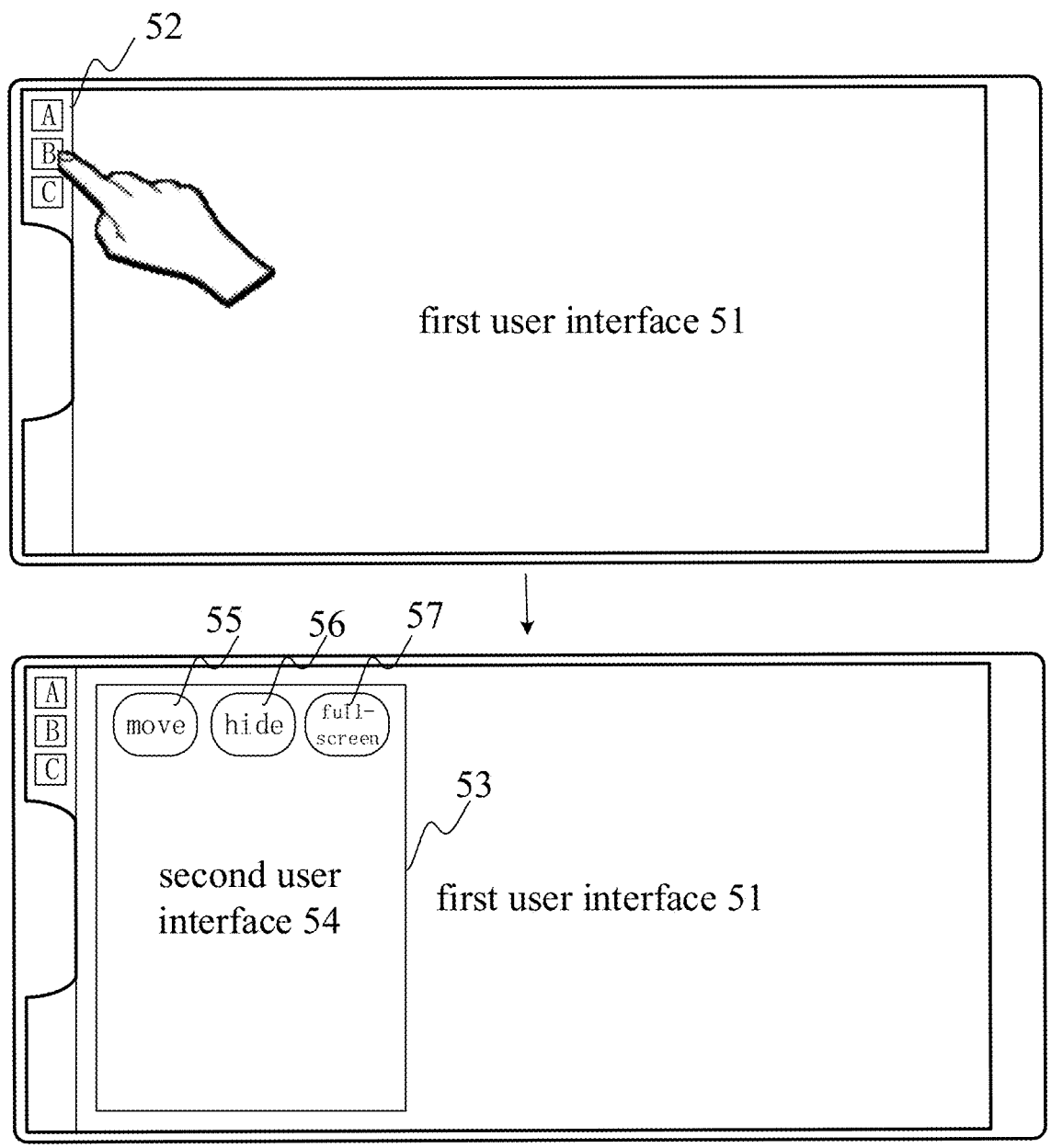

According to embodiments, at least one of a hide button, a full-screen button, and a move button is also displayed on the floating window. Referring to FIG. 15, after a user taps the program icon of the second application program B in the first auxiliary display region 52, the terminal superimposes and displays a floating window 53 on the main display region. The floating window 53 is used to display the second user interface 54 for the second application program B. The floating window 53 also displays a move button 55, a hide button 56, and a full-screen button 57.

In step 606, when a second operation signal on the hide button in the floating window is received, displaying of the floating window is canceled.

According to embodiments, the second operation signal is any one of a click or tap signal, a double-click or double tap signal, and a long-press signal. In an example, the second operation signal is a tap signal.

According to embodiments, when the user taps the hide button, the terminal cancels the displaying of the floating window and turns off the second application program. Alternatively, when the user taps the hide button, the terminal cancels the displaying of the floating window and switches the second application program to the background running state.

Figure 16:
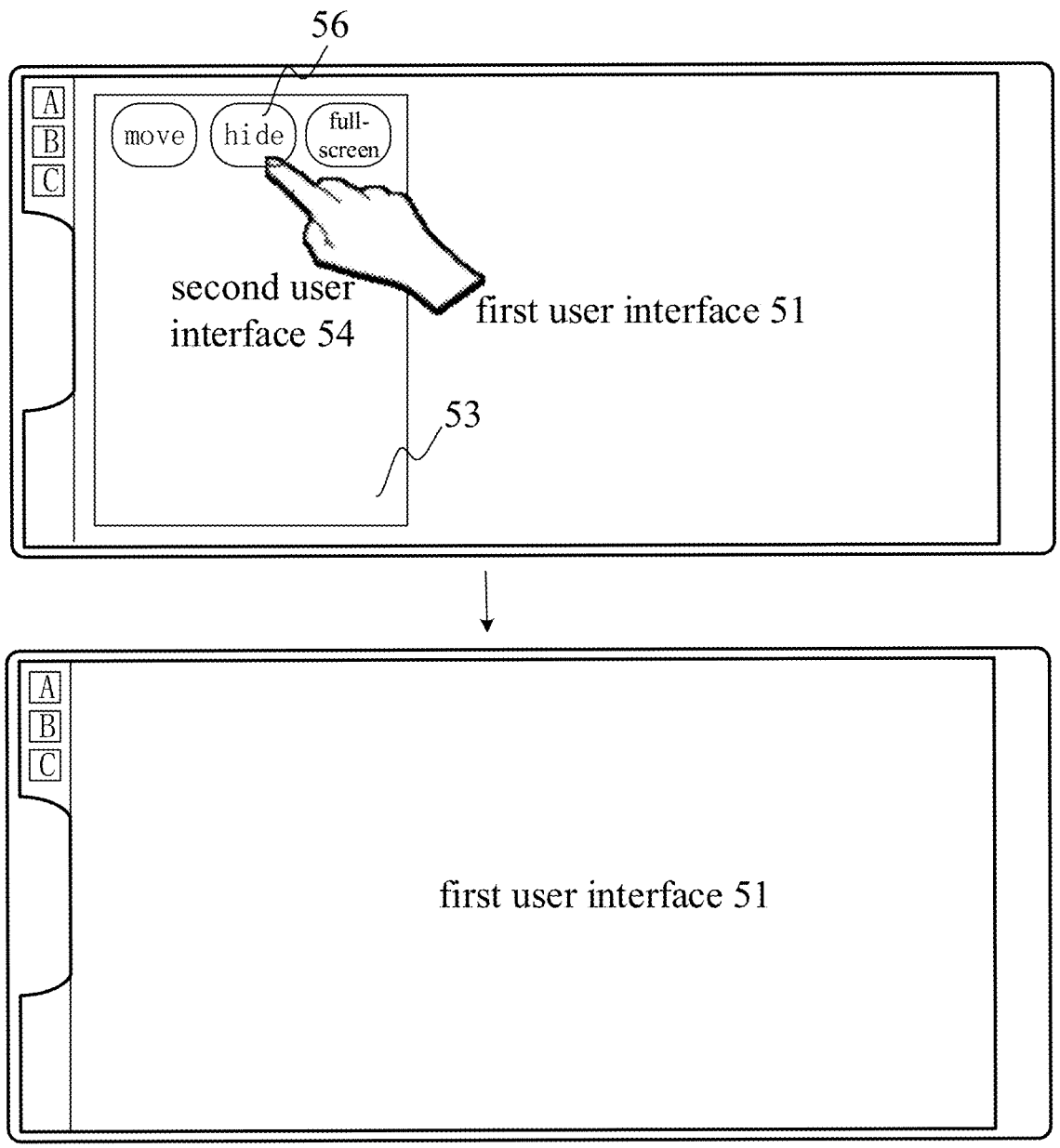

Referring to FIG. 16, when the user taps the hide button 56 in the floating window 53, the terminal cancels the displaying of the floating window 53.

In step 607, when a third operation signal on the full-screen button is received, the second user interface for the second application program is displayed in the main display region in a full-screen mode.

According to embodiments, the third operation signal is any one of a click or tap signal, a double-click or double-tap signal, and a long-press signal. In an example, the third operation signal is a tap signal.

After the user taps the full-screen button, the terminal displays the second user interface for the second application program in the main display region in a full-screen mode, and switches the first application program from the foreground running state to the background running state.

Figure 17:
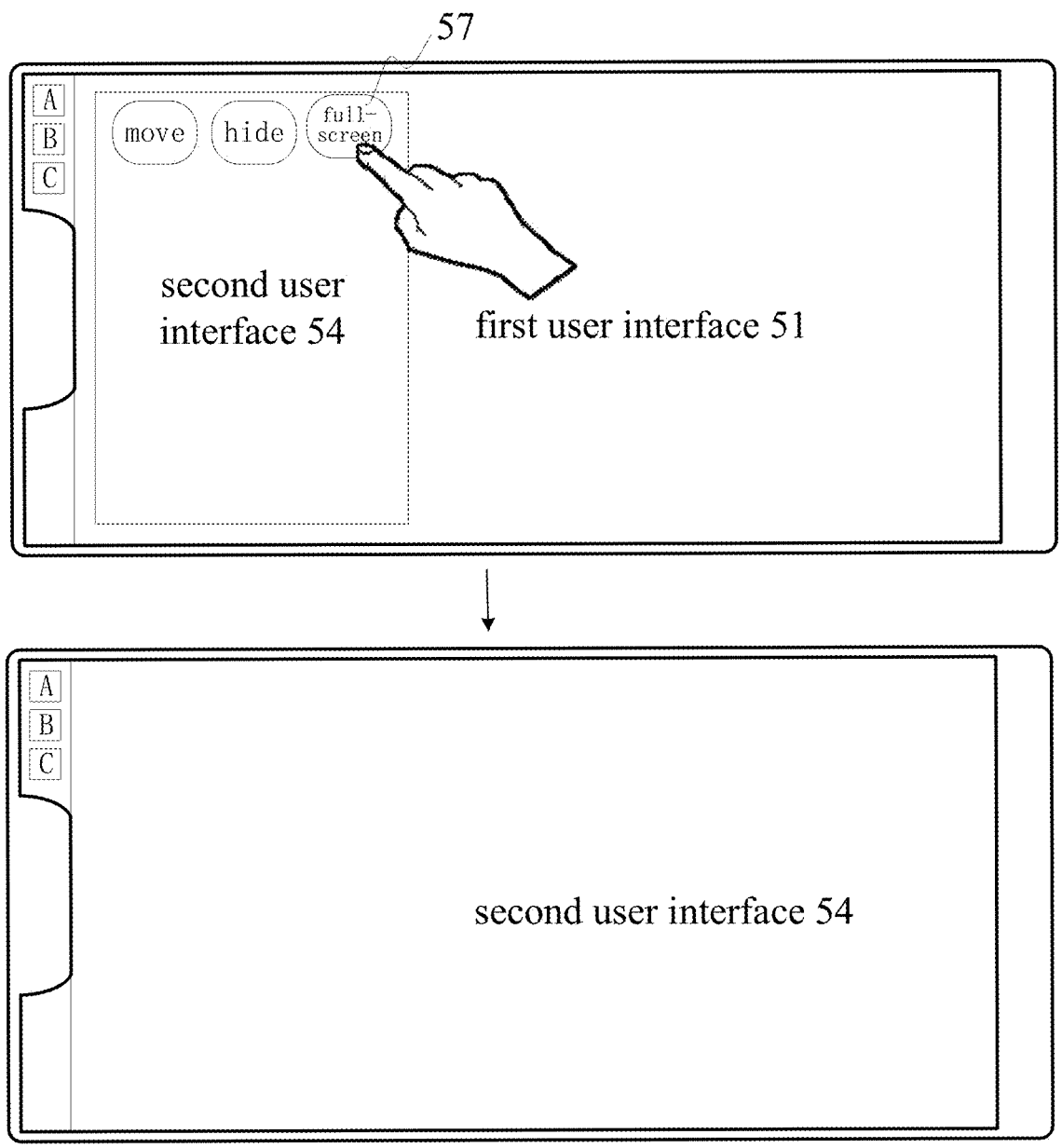

Referring to FIG. 17, after the user taps the full-screen button 57 in the floating window 53, the terminal displays the second user interface 54 in a full-screen mode in the entire main display region.

In step 608, when a fourth operation signal on the move region is received, the display position of the floating window in the main display region is changed according to the fourth operation signal.

According to embodiments, the fourth operation signal is a drag signal. The move region can be a button, a control, or any area on the floating window.

After the user drags the move region, the terminal changes the display position of the floating window in the main display region according to the fourth operation signal.

Figure 18:
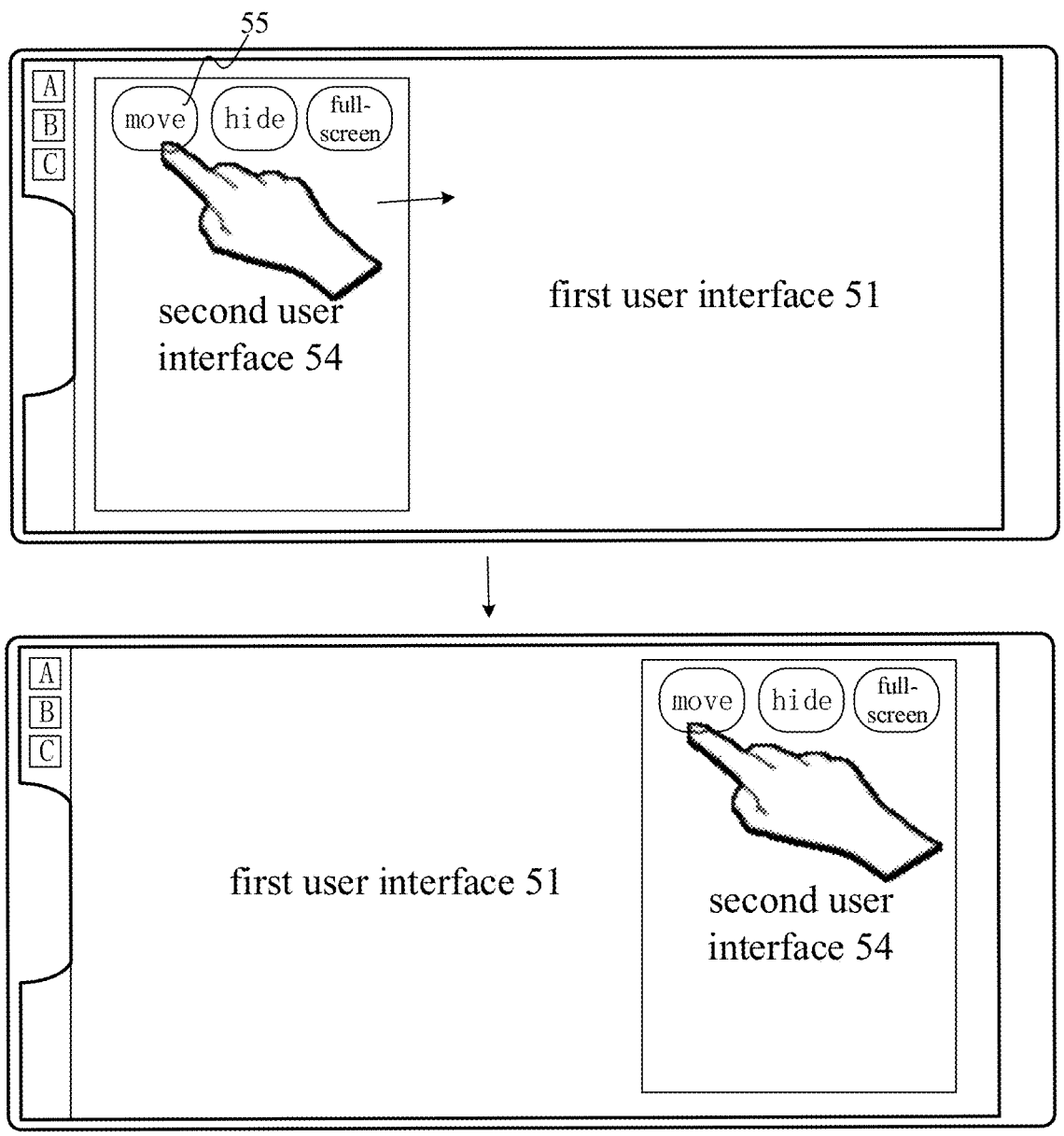

Referring to FIG. 18, when the user drags the move button 55 in the floating window 53, the terminal changes the display position of the floating window 53 following the drag signal. In other embodiments, the move button 55 may not be displayed, and any region on the floating window may be used instead.

Only one of the above steps 606 to 608 may be executed, or a plurality of them may be executed, depending on the operation signal actually received by the terminal, which is not limited in embodiments of the present disclosure.

In view of the above, in the user interface display method according to embodiments of the present disclosure, the program icon of the second application program is displayed in the auxiliary display region, and when the first operation signal on the program icon is received, a floating window is displayed on the first user interface. The floating window is used to display the second user interface for the second application program. The method according embodiments of the present disclosure can simplify the operation steps when the user switches between different application programs, and improve the efficiency of human-machine interaction. Also, the method according embodiments of the present disclosure does not interrupt the user's ongoing use of the first application program. For example, if the first application program is a game application program, it is convenient for the user to quickly operate the second application program without interrupting the game experience.

In the user interface display method according to embodiments of the present disclosure, two display modes are designed for the auxiliary display region, and the first sliding signal and the third sliding signal are used to switch between the two display modes. In this way, the auxiliary display region can display information within the limited area as much as possible to improve the utilization rate of the auxiliary display region.

In the user interface display method according to embodiments of the present disclosure, by adding the move button, the hide button, and the full-screen button to the floating window, users can freely change the display position and display state of the floating window. As a result, users can freely use the first application program, the second application program and can conduct simultaneous use of both. For example, the first application program is a video player, the second application program is an instant messaging program, and users can chat with other users without affecting the video playback process. For another example, the first application program is a game program, the second application program is a video chat program, and users can play games and perform video chat with other users at the same time. For a further example, the first application program is a text editing program, the second application program is a dictionary program, users can use the text editing program to edit text during the process of searching for words or translating at the same time.

It should be noted that the program type, number, and display order of the second application program may be preset by the operating system, or may be customized by users.

Figure 19:
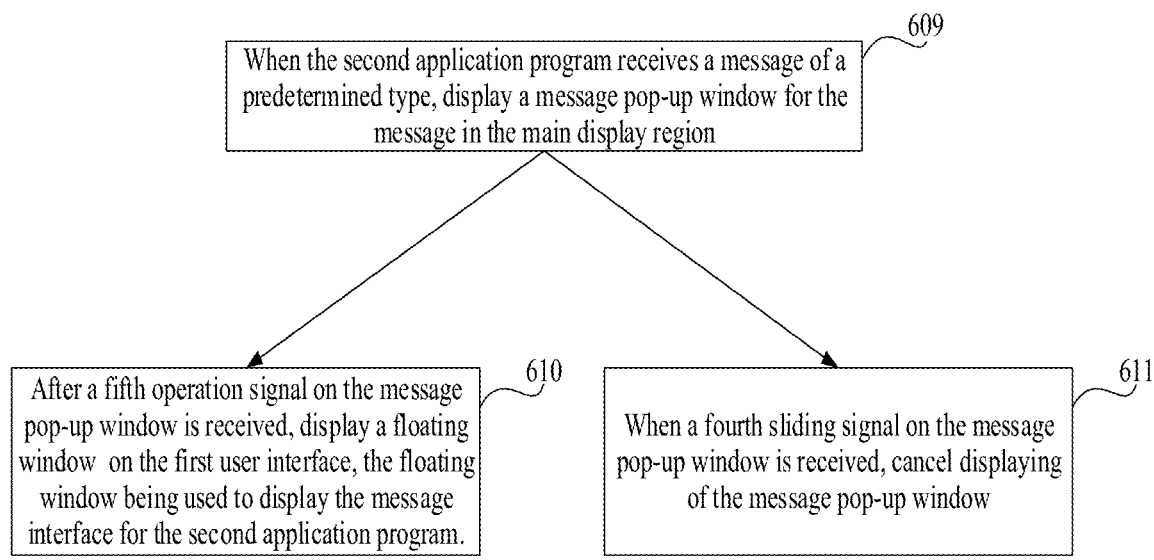
FIG. 19 is a flowchart of a user interface display method according to an exemplary embodiment of the present disclosure.

When the second application program is an instant communication program, a voice chat program, or a video chat program, a voice conversation message or a video conversation message initiated by a friend may be received. In an alternative embodiment based on the embodiment shown in FIG. 9, the following steps may also be included, as shown in FIG. 19.

In step 609, when the second application program receives a message of a predetermined type, a message pop-up window for the message is displayed in the main display region.

According to embodiments, the predetermined type of message refers to a voice conversation message or a video conversation message.

When the second application program receives the voice conversation message or the video conversation message, a message pop-up window displaying the voice conversation message or the video conversation message is superimposed on the first user interface. The message pop-up window may be a mini message pop-up window. The message pop-up window displays information such as the nickname, avatar and receiving button of the requesting party.

In step 610, after a fifth operation signal on the message pop-up window is received, a floating window is displayed on the first user interface. The floating window is used to display the message interface for the second application program.

Figure 20:
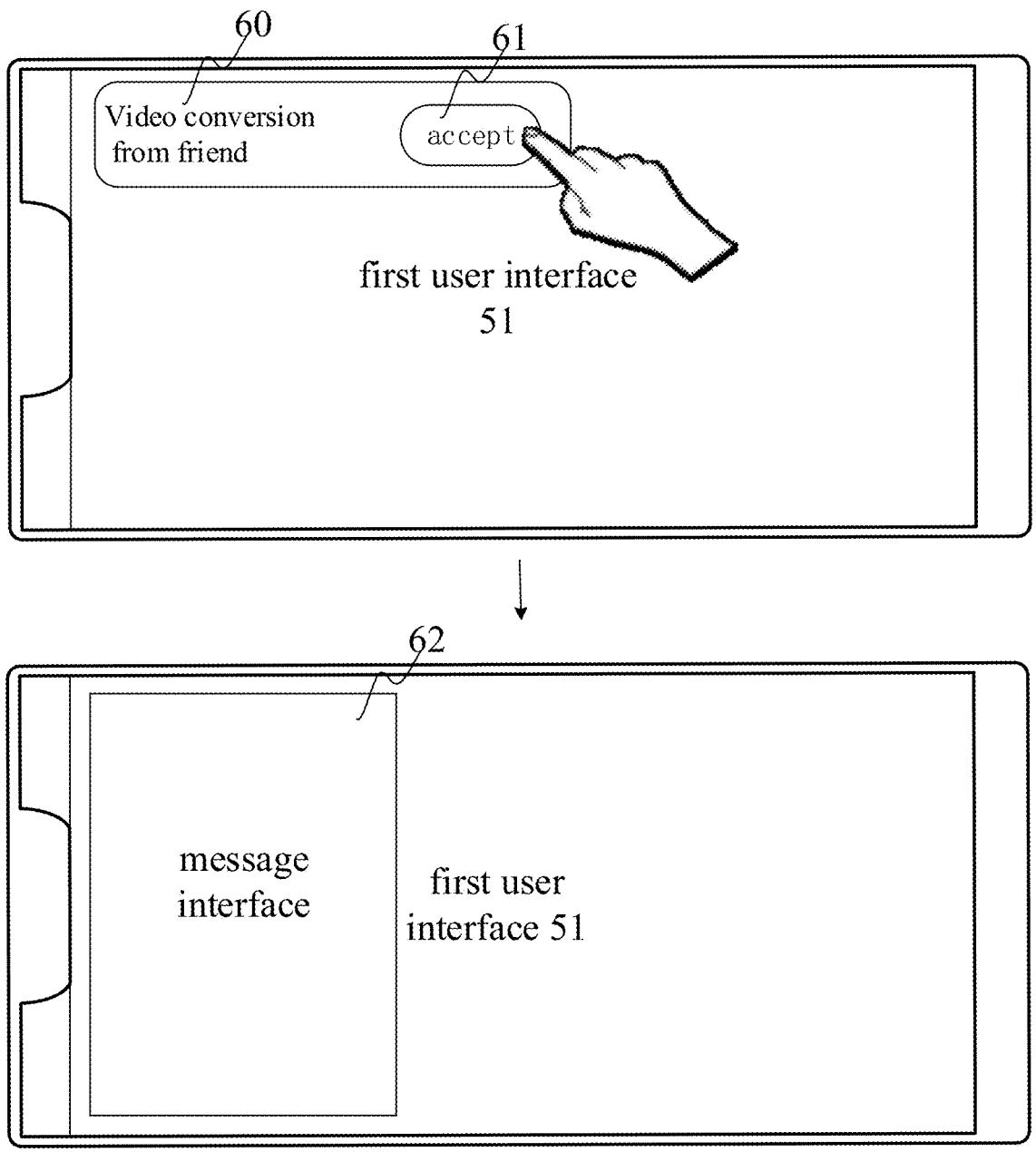
FIGS. 20 to 21 are schematic diagrams showing interfaces during the implementation of the user interface display method according to the embodiment in FIG. 19.

Referring to FIG. 20, the fifth operation signal may be a tap signal on the answer button 61 in the message pop-up window 60. When the terminal receives the tap signal on the answer button 61, a floating window 62 is displayed on the first user interface 51, and the floating window is used to display a message interface for the second application program. The message interface may be an interface for voice calls or video calls.

In step 611, when a fourth sliding signal on the message pop-up window is received, displaying of the message pop-up window is canceled.

According to embodiments, the fourth sliding signal is a signal indicating sliding from the central area of the message pop-up window to the outside of the message pop-up window. For example, the fourth sliding signal may be a signal indicating the sliding operating from the central area of the message pop-up window to the upper or left side of the message pop-up window.

When a user does not want to make a voice call or a video call with the requester, the user can slide the message pop-up window, and when the terminal receives the fourth sliding signal on the message pop-up window, the message pop-up window is canceled.

Figure 21:
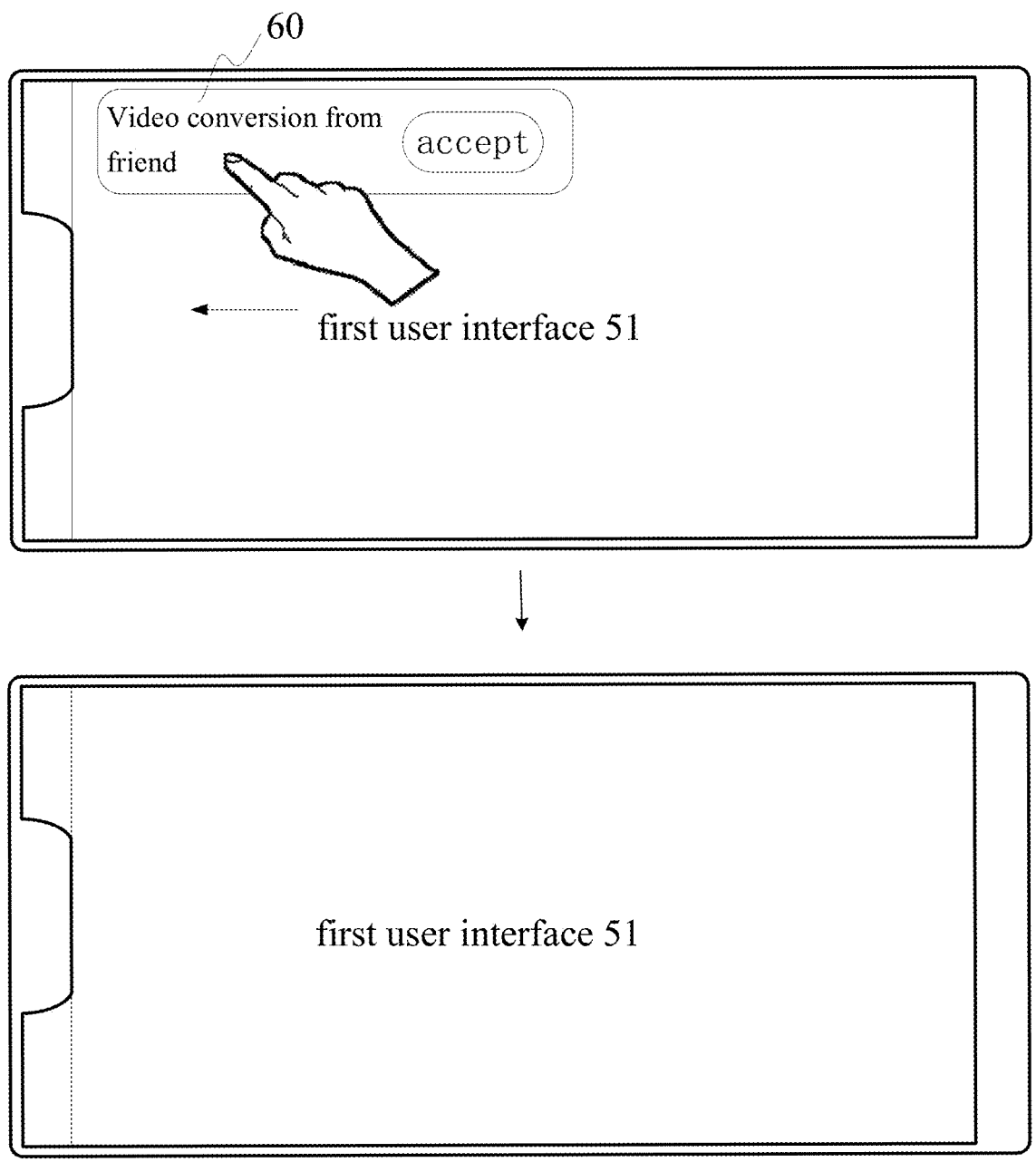

Referring to FIG. 21, when the terminal receives the sliding signal on the message pop-up window 60, the displaying of the message pop-up window is canceled.

In the user interface display method according to embodiments of the present disclosure, the message popup window for the message can be displayed in the main display region when receiving a predetermined type of message, without affecting the user's use of the first application program, and voice conversations or video conversations with other users can be conducted simultaneously, thereby improving the service efficiency of the terminal.

Figure 22:
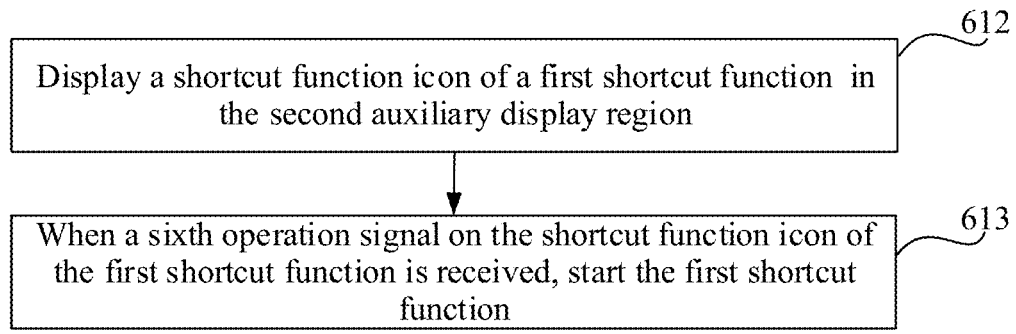
FIG. 22 is a flowchart of a user interface display method according to an exemplary embodiment of the present disclosure.

There are two auxiliary display regions provided in the previous embodiment: a first auxiliary display region and a second auxiliary display region. The first auxiliary display region is located on the right side, and the second auxiliary display region is located on the left side. Of course, the positions of the two auxiliary display regions can be exchanged. In an alternative embodiment based on the embodiment shown in FIG. 9, an extended function may also be provided for the second auxiliary display region. The above method embodiment may further include the following steps, as shown in FIG. 22.

In step 612, a shortcut function icon of a first shortcut function is displayed in the second auxiliary display region.

The terminal may display shortcut function icons of one or more shortcut functions in the second auxiliary display region. The shortcut function is a function item provided by the operating system, the system's own application program, or a third-party application program. That is, the shortcut function is a smaller function granularity than the application program, and the shortcut function is usually one of the multiple function items provided for the application program. Shortcut functions include but are not limited to: at least one of screenshot function, screen recording function, flashlight-on function, Bluetooth-on function, mute function, and screen lock function.

In step 613, when a sixth operation signal on the shortcut function icon of the first shortcut function is received, the first shortcut function is started.

According to embodiments, the sixth operation signal is any one of a click or tap signal, a double-click or double tap signal, and a long-press signal. In an example, the sixth operation signal is a tap signal.

When the terminal receives the user's tap signal on the shortcut function icon of the first shortcut function, the terminal starts the first shortcut function. If the first shortcut function is a screenshot function, the terminal takes a screenshot of all or part of the display screen. if the first shortcut function is a screen recording function, the terminal records the screen or the main display region. If the first shortcut function is flashlight-on function, the terminal turns on the flashlight function. If the first shortcut function is to open Bluetooth, the terminal enables Bluetooth connection function. If the first shortcut function is the mute function, the terminal silences the sound outputs of the entire operating system or the application programs currently running in the foreground. If the first shortcut function is to lock the screen, the terminal sets the display screen or the main display region to be in a non-responsive state to the touch signal.

It should be noted that the execution order of step 612 and step 613 is not limited, and may be executed before step 601, at the same time with any step, between any two steps, or after step 608.

In the user interface display method according to embodiments of the present disclosure, the shortcut function icon of the first shortcut function is also displayed in the auxiliary display region, so that the user can quickly start the first shortcut function without quitting the first application program. The method according to embodiments of the present disclosure can reduce the user's operation steps and improves the efficiency of human-computer interaction.

Figure 23:
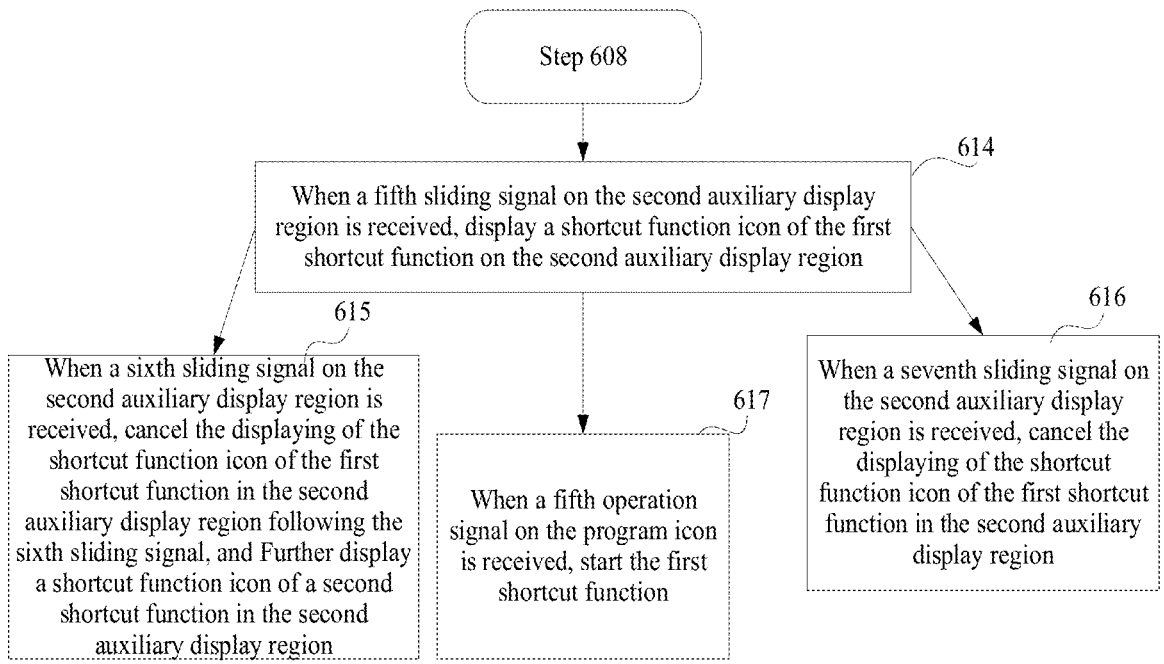
FIG. 23 is a flowchart of a user interface display method according to an exemplary embodiment of the present disclosure.

In an alternative embodiment, the second auxiliary display region displays status bar information in a default state (such as portrait mode). The status bar information includes at least one of the name of the operator, signal strength, network standard, time, date, battery power, WiFi network information, and Bluetooth information. The above steps 612 and 613 may be alternatively implemented as the following steps 614 to 617, as shown in FIG. 23.

In step 614, when a fifth sliding signal on the second auxiliary display region is received, a shortcut function icon of the first shortcut function is displayed on the second auxiliary display region.

According to embodiments, the second auxiliary display region includes a first long side, a first short side, a second long side, and a second short side which are connected in sequence.

According to embodiments, the fifth sliding signal is a signal indicating sliding from the first long side to the second long side of the second auxiliary display region, and the distance between the first long side and the main display region is greater than the distance between the second long side and the main display region.

When the terminal receives the fifth sliding signal on the second auxiliary display region, the terminal switches from displaying the initial display content in the first auxiliary display region to displaying the shortcut function icon of the first shortcut function. There may be one or more displayed first shortcut functions. When there are multiple first shortcut functions, the terminal may display multiple program icons of the first shortcut functions in the second auxiliary display region.

The first shortcut functions are function items provided by the operating system or application programs. The first shortcut functions include but are not limited to at least one of screenshot function, screen recording function, flashlight-on function, Bluetooth-on function, mute function, and screen lock function.

Figure 24:
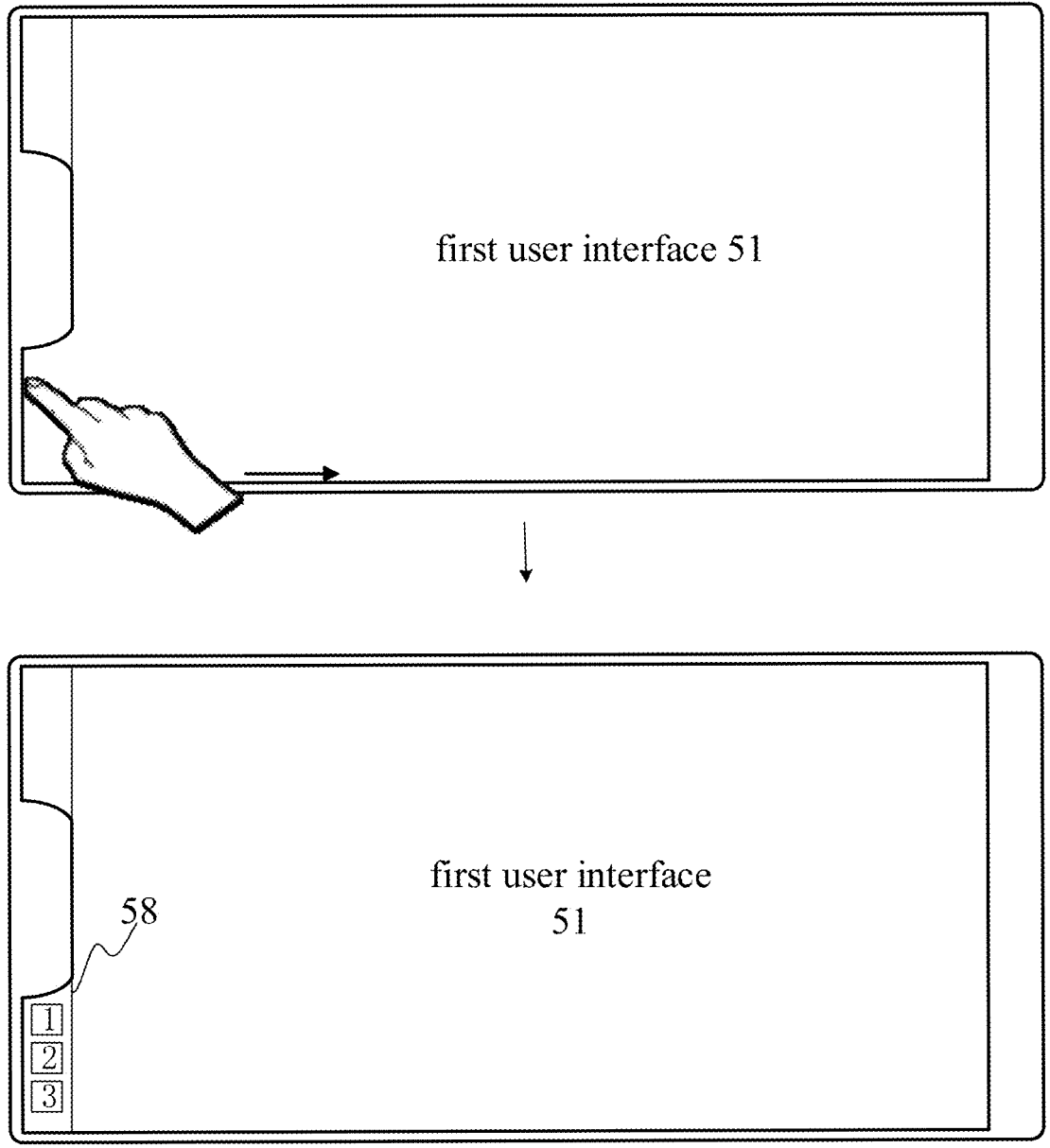
FIGS. 24 to 26 are schematic diagrams of interfaces during the implementation of the user interface display method according to the embodiment in FIG. 23.

Referring to FIG. 24, when the terminal receives a fifth sliding signal (sliding from the top to the bottom of the terminal) on the second auxiliary display region 58, the terminal displays the shortcut function icons of a first shortcut function 1, a first shortcut function 2 and a first shortcut function 3 in the second auxiliary display region 58. The second auxiliary display region 58 does not display any content in the initial state.

In an exemplary embodiment, the terminal responds to the fifth sliding signal when the terminal receives the fifth sliding signal on the second auxiliary display region and the body state is in the landscape state. As an example, the terminal may only respond to the fifth sliding signal in the landscape display mode, and not respond to the fifth sliding signal in the portrait screen display mode. Under such condition, when the terminal receives the fifth sliding signal on the second auxiliary display region, the terminal detects whether the body state is the landscape screen state; when the body state is the landscape screen state, the shortcut function icon of the first shortcut function is displayed in the second auxiliary display region; otherwise, the terminal does not respond to the fifth sliding signal, or responds to the fifth sliding signal in other ways. The other ways may include popping up a pull-down notification bar. For another example, when the body of the terminal is in a portrait state, the signal reception function of the second auxiliary display region is turned off; when the body of terminal is in the landscape state, the signal reception function of the second auxiliary display region is enabled. When the fifth sliding signal on the second auxiliary display region is received, the shortcut function icon of the first shortcut function is displayed in the second auxiliary display region.

In step 615, when a sixth sliding signal on the second auxiliary display region is received, the displaying of the shortcut function icon of the first shortcut function in the second auxiliary display region is canceled following the sixth sliding signal, and displaying of a shortcut function icon of a second shortcut function is added to the second auxiliary display region.

The sixth sliding signal may be a signal indicating sliding from the first short side to the second short side of the second auxiliary display region, or a signal indicating sliding from the second short side to the first short side. According to embodiments, the sixth sliding signal and the second sliding signal are signals of the same type but with different action positions.

Due to the limited display area of the second auxiliary display region, the terminal may not be able to display the shortcut function icons of all shortcut functions in the second auxiliary display region at once. The terminal may first display the shortcut function icon of the first shortcut function in the second auxiliary display region. When receiving the sixth sliding signal of the user on the second auxiliary display region, the terminal cancels the displaying of the shortcut function icon of the first shortcut function in the auxiliary display region in response to the sixth sliding signal, and the displaying of the shortcut function icon of the second shortcut function is added to the second auxiliary display region.

That is, the terminal will follow the sixth sliding signal to display shortcut function icons in the second auxiliary display region in a scroll manner. The scroll displaying includes: canceling the displaying of the shortcut function icon that is moved out of the second auxiliary display region, displaying the shortcut function icon that is moved into the second auxiliary display region, and changing the display positions of the function icons that are still in the second auxiliary display region in response to the sixth sliding signal.

Figure 25:
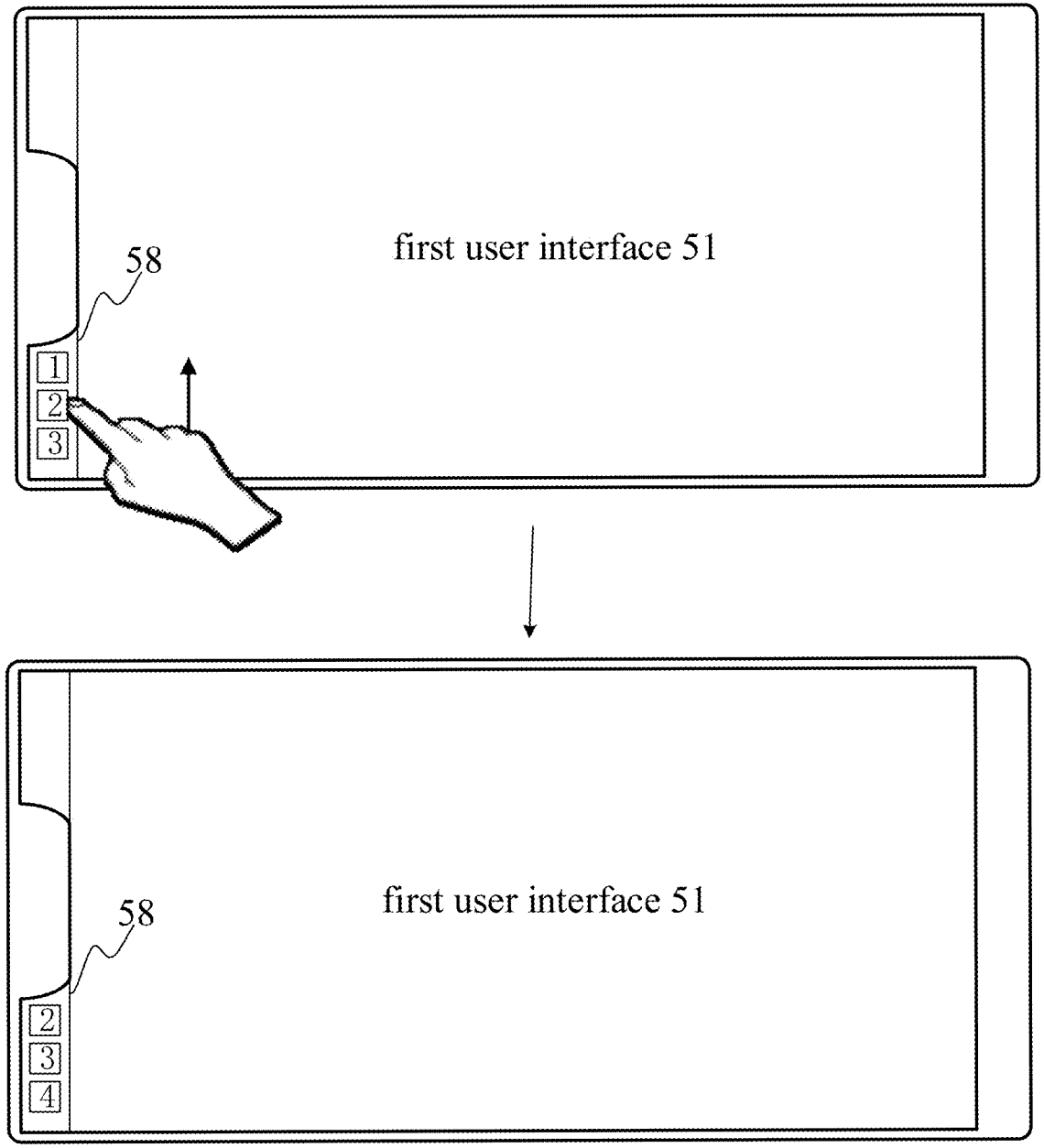

Referring to FIG. 25, when the terminal receives the sixth sliding signal on the second auxiliary display region 58, the terminal, in response to the sixth sliding signal, moves the first shortcut function 1 out of the second auxiliary display region 58, and moves the second shortcut function 4 into the second auxiliary display region 58 and displays the second shortcut function 4.

In step 616, when a seventh sliding signal on the second auxiliary display region is received, the displaying of the shortcut function icon of the first shortcut function in the second auxiliary display region is canceled.

According to embodiments, the seventh sliding signal is a signal indicating sliding from the second long side to the first long side. The seventh sliding signal and the third sliding signal may be signals of the same type but have different trigger positions.

When the terminal receives the seventh sliding signal on the second auxiliary display region, the terminal switches from displaying the shortcut function icon of the first shortcut function in the second auxiliary display region to displaying the initial display content. The initial display content may be displaying nothing, or displaying status bar information, or displaying content matching the first application program.

Figure 26:
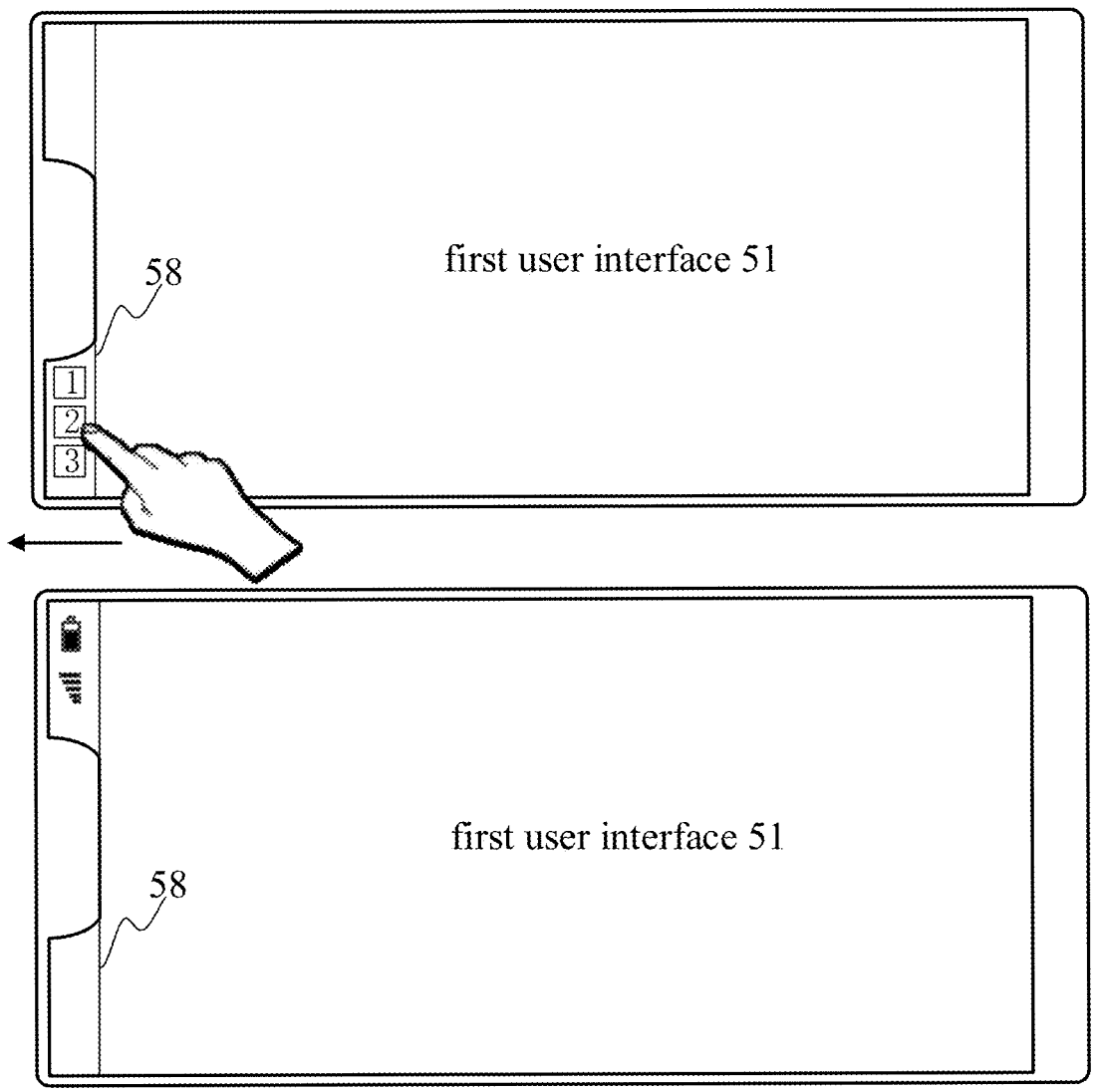

Referring to FIG. 26, when the terminal receives a seventh sliding signal (slides from the bottom to the top of the terminal) on the second auxiliary display region 58, the terminal switches from displaying the program icons of the first shortcut function 1, the first shortcut function 2, and the first short function 3 in the second auxiliary display region to displaying nothing in the second auxiliary display region.

In step 617, when to sixth operation signal on the program icon is received, the first shortcut function corresponding to the shortcut function icon is started.

According to embodiments, the fifth operation signal is any one of a click or tap signal, a double-click or double-tap signal, and a long-press signal. In an example, the fifth operation signal is a tap signal.

When the terminal receives the user's tap signal on the shortcut function icon, the terminal starts the first shortcut function corresponding to the shortcut function icon. If the first shortcut function is a screenshot function, the terminal takes a screenshot of all or part of the display screen. If the first shortcut function is a screen recording function, the terminal records the screen or the main display region. If the first shortcut function is to turn on flashlight, the terminal turns on the flashlight function. If the first shortcut function is to turn on Bluetooth, the terminal enables Bluetooth connection function. If the first shortcut function is mute, the terminal silences the audio output of the entire operating system or the application program currently running in the foreground. If the first shortcut function is to lock the screen, the terminal sets the display screen or the main display region to be in a non-responsive state to the touch signal.

In the user interface display method according to embodiments of the present disclosure, two display modes are designed for the second auxiliary display region, and switching between the two display modes is performed through the fourth sliding signal and the sixth sliding signal to make the second auxiliary display region display information within a limited display region as much as possible, thereby improving the utilization rate of the auxiliary display region.

It should be noted that, in an exemplary embodiment, the first auxiliary display region and the second auxiliary display region may be regarded as a whole auxiliary display region, in which case the fifth sliding signal and the first sliding signal may be the same sliding signal, the sixth sliding signal and the second sliding signal may be the same sliding signal, and the seventh sliding signal and the third sliding signal may be the same sliding signal. No matter which of the first auxiliary display region and the second auxiliary display region receives the sliding signal, the display content in the first auxiliary display region and the second auxiliary display region will be changed at the same time.

It should also be noted that, in another exemplary embodiment, the program icon of the second application program and the shortcut function icon of the first shortcut function may be simultaneously displayed in the first auxiliary display region or the second auxiliary display region. That is, a mixed display of the program icon of the application program and the shortcut function icon of the shortcut function can be conducted.

Figure 27:
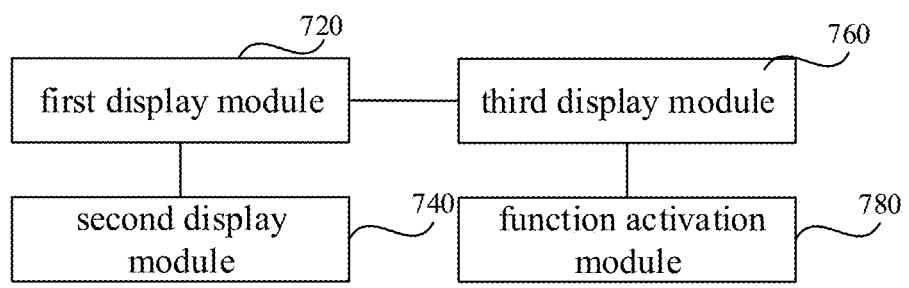
FIG. 27 is a schematic structural diagram of a user interface display device according to an exemplary embodiment of the present disclosure.

FIG. 27 shows a structural block diagram of a user interface display device according to an embodiment of the present disclosure. The user interface display device can be implemented as all or part of a terminal through software, hardware, or a combination of both. The device includes a first display module 720, and a second display module 740.

The first display module 720 is configured to display a first user interface for a first application program in a main display region.

The second display module 740 is configured to display a program icon of a second application program in an auxiliary display region.

The second display module 740 is further configured to, when a first operation signal on the program icon is received, display a floating window on the first user interface, wherein the floating window is used to display a second user interface for the second application program.

According to an exemplary embodiment, the second display module 740 is further configured to: display the floating window by superimposing the floating window on a partial area of the first user interface, wherein a distance between the partial area and the auxiliary display region is smaller than a preset distance.

According to an exemplary embodiment, a hide button is further displayed in the floating window;

the second display module 740 is further configured to, when a second operation signal on the hide button is received, cancel displaying of the floating window.

According to an exemplary embodiment, the second display module is further configured to: when the second operation signal on the hide button is received, switch the second application program to a background running state.

According to an exemplary embodiment, a full-screen button is further displayed in the floating window;

the second display module 740 is further configured to, when a third operation signal on the full-screen button is received, display the second user interface for the second application program in a full-screen mode in the main display region.

According to an exemplary embodiment, a move region is further displayed in the floating window;

the second display module 740 is further configured to, when a fourth operation signal on the move region is received, change a display position of the floating window in the main display region according to the fourth operation signal.

According to an exemplary embodiment, the second display module 740 is further configured to: when a first sliding signal on the auxiliary display region is received, display the program icon of the second application program on the auxiliary display region.

According to an exemplary embodiment, the auxiliary display region includes a first long side, a first short side, a second long side and a second short side which are connected in sequence;

the first sliding signal is a signal indicating sliding from the first long side to the second long side, and a distance between the first long side and the main display region is greater than a distance between the second long side and the main display region.

According to an exemplary embodiment, the second display module 740 is further configured to:

when the first sliding signal on the auxiliary display region is received and a body state is a landscape state, display the program icon of the second application program in the auxiliary display region.

According to an exemplary embodiment, the second display module 740 is further configured to:

when a second sliding signal on the auxiliary display region is received, cancel displaying of the program icon of the second application program in the auxiliary display region following the second sliding signal on the auxiliary display region and further display a program icon of a third application program.

According to an exemplary embodiment, the auxiliary display region includes a first long side, a first short side, a second long side, and a second short side which are connected in sequence;

the second sliding signal is a signal indicating sliding from the first short side to the second short side, or the second sliding signal is a signal indicating sliding from the second short side to the first short side.

According to an exemplary embodiment, the second display module 740 is further configured to: when a third sliding signal on the auxiliary display region is received, cancel displaying of the program icon of the second application program in the auxiliary display region.

According to an exemplary embodiment, the auxiliary display region includes a first long side, a first short side, a second long side and a second short side which are connected in sequence;

the third sliding signal is a signal indicating sliding from the second long side to the first long side, and a distance between the first long side and the main display region is greater than a distance between the second long side and the main display region.

According to an exemplary embodiment, the second display module 740 is further configured to: when the second application program receives a message of a predetermined type, display a message pop-up window for the message in the main display region; and after a fifth operation signal on the message pop-up window is received, display a floating window on the first user interface, wherein the floating window is used to display a message interface for the second application program.

According to an exemplary embodiment, the second display module 740 is further configured to: when a fourth sliding signal on the message pop-up window is received, cancel displaying of the message pop-up window.

According to an exemplary embodiment, the fourth sliding signal is a signal indicating sliding from a central area of the message pop-up window to an outside of the message pop-up window.

According to an exemplary embodiment, the second application program is an application program having a message receiving function;

the second display module 740 is further configured to, when a message for the second application program is received, display a badge on the program icon of the second application program, wherein the badge is used to indicate that there is an unread message for the second application program.

According to an exemplary embodiment, the device further includes: a third display module 760 configured to display a shortcut function icon of a first shortcut function in the auxiliary display region; and a function activation module 780 configured to, when a sixth operation signal on the shortcut function icon is received, activate the first shortcut function.

According to an exemplary embodiment, the third display module 760 is configured to: when a fifth sliding signal on the auxiliary display region is received, display a shortcut function icon of the first shortcut function in the auxiliary display region.

According to an exemplary embodiment, the auxiliary display region includes a first long side, a first short side, a second long side, and a second short side which are connected in sequence;

the fifth sliding signal is a signal indicating sliding from the first long side to the second long side, and a distance between the first long side and the main display region is greater than a distance between the second long side and the main display region.

According to an exemplary embodiment, the third display module 760 is further configured to: when a sixth sliding signal on the auxiliary display region is received, cancel displaying of the shortcut function icon of the first shortcut function in the auxiliary display region following the sixth sliding signal on the auxiliary display region, and further displaying a shortcut function icon of a second shortcut function in the auxiliary display region.

According to an exemplary embodiment, the auxiliary display region includes a first long side, a first short side, a second long side, and a second short side which are connected in sequence;

the sixth sliding signal is a signal indicating sliding from the first short side to the second short side, or the second sliding signal is a signal indicating sliding from the second short side to the first short side.

According to an exemplary embodiment, the third display module 760 is further configured to: when a seventh sliding signal on the auxiliary display region is received, cancel displaying of the shortcut function icon of the first shortcut function in the auxiliary display region.

According to an exemplary embodiment, the seventh sliding signal is a signal indicating sliding from the second long side to the first long side, and a distance between the first long side and the main display region is greater than a distance between the second long side and the main display region.

Figure 28:
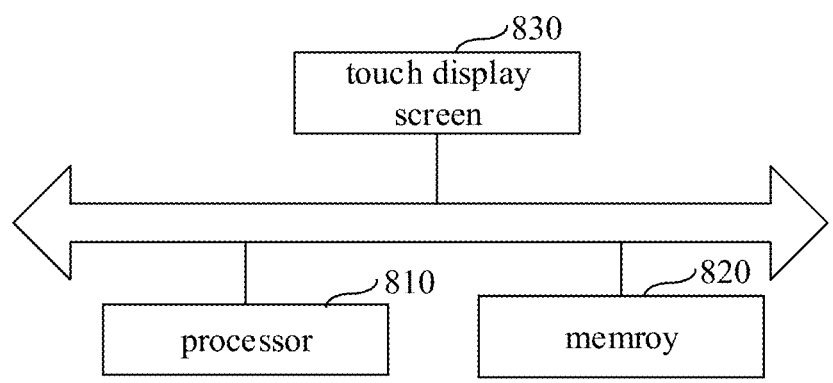
FIG. 28 is a schematic structural diagram of a terminal according to an exemplary embodiment of the present disclosure.

FIG. 28 shows a structural block diagram of a terminal according to an exemplary embodiment of the present application. The terminal includes a processor 801, a memory 802, and a touch screen 803.

The processor 801 may be a Central Processing Unit (CPU), a Network Processor (NP), or a combination of CPU and NP. The processor 801 may further include a hardware chip. The hardware chip may be an Application-Specific Integrated Circuit (ASIC), a Programmable Logic Device (PLD), or a combination thereof. The PLD can be a Complex Programmable Logic Device (CPLD), a Field-Programmable Gate Array (FPGA), A Generic Array Logic (GAL) or any combination thereof.

The memory 802 is connected to the processor 801 through a bus or other means. The memory 802 stores at least one instruction, at least one program, code set, or instruction set. The at least one instruction, at least one program, code set, or instruction set is loaded and executed by the processor 801 to implement the user interface display method according to embodiments of the present disclosure. The memory 802 may be a volatile memory, a non-volatile memory, or a combination thereof. The volatile memory can be Random Access Memory (RAM) such as Static Random Access Memory (SRAM), Dynamic Random Access Memory (DRAM). The non-volatile memory can be Read Only Memory image, ROM), such as Programmable Read Only Memory (PROM), Erasable Programmable Read Only Memory (EPROM), Electrically Erasable Programmable Read Only Memory (EEPROM). The non-volatile memory may also be flash memory, magnetic memory such as magnetic tape, floppy disk, or hard disk. The non-volatile memory may also be an optical disk.

The touch screen 803 is connected to the processor 801 through a bus or other means. The memory 802 stores at least one instruction, and the at least one instruction is loaded and executed by the processor 801 to implement the user interface display method according to embodiments of the present disclosure. An embodiment of the present disclosure also provides a computer-readable medium that stores at least one instruction, and the at least one instruction is loaded and executed by the processor to implement the user interface display according to embodiments of the present disclosure. An embodiment of the present disclosure further provides a computer program product that stores at least one instruction, and the at least one instruction is loaded and executed by the processor to implement the user interface display method according to embodiments of the present disclosure. Those skilled in the art should understand that in the above one or more examples, the functions described in the embodiments of the present disclosure may be implemented by hardware, software, firmware, or any combination thereof. When implemented in software, these functions can be stored in a computer-readable medium or transmitted as one or more instructions or codes on a computer-readable medium. The computer-readable medium includes computer storage medium and communication medium. The communication medium includes any medium that facilitates transfer of a computer program from one place to another. The storage medium may be any available medium that can be accessed by a general-purpose or special-purpose computer.

The above are only exemplary embodiments of the present disclosure, and the present disclosure is not limited to the described embodiments. Any modification, equivalent replacement, improvement, or the like made within the spirit and principle of the present disclosure fall within the protection scope of the present disclosure.

What is claimed is:

1. A method for displaying a user interface on a smart phone, comprising:
    displaying a first user interface for a first application program in a main display region;
    displaying a program icon of a second application program in an auxiliary display region; and
    when a first operation signal on the program icon is received, displaying a floating window on the first user interface, wherein the floating window is used to display a second user interface for the second application program, wherein a move button is further displayed in the floating window;
    wherein the auxiliary display region comprises a first auxiliary display region and a second auxiliary display region, the first auxiliary display region located on an opposite side of a notch of a display screen of the smart phone from the second auxiliary display region, wherein the first auxiliary display region comprises a first long side, a first short side, a second long side and a second short side which are connected in sequence;
    wherein the method further comprises:
        displaying a shortcut function icon of a first shortcut function in the second auxiliary display region;
        wherein the program icon of a second application program is displayed in the first auxiliary display region, and when a first sliding signal on the first auxiliary display region is received, displaying the program icon of the second application program on the auxiliary display region;

wherein the first sliding signal is a signal indicating sliding from the first long side to the second long side, and a distance between the first long side and the main display region is greater than a distance between the second long side and the main display region:

when a fourth operation signal on the move button is received, changing a display position of the floating window in the main display region according to the fourth operation signal.

2. The method according to claim 1, wherein displaying a floating window on the first user interface comprises:

displaying the floating window by superimposing the floating window on a partial area of the first user interface, wherein a distance between the partial area and the auxiliary display region is smaller than a preset distance.

3. The method according to claim 2, wherein a hide button is further displayed in the floating window, and the method further comprises:

when a second operation signal on the hide button is received, cancelling displaying of the floating window.

4. The method according to claim 3, further comprising:
when the second operation signal on the hide button is received, switching the second application program to a background running state.

5. The method according to claim 2, wherein a full-screen button is further displayed in the floating window and the method further comprises:

when a third operation signal on the full-screen button is received, displaying the second user interface for the second application program in a full-screen mode in the main display region.

6. The method according to claim 1, wherein when the first sliding signal on the first auxiliary display region is received, displaying the program icon of the second application program on the auxiliary display region, comprises:

when the first sliding signal on the first auxiliary display region is received and a body state is a landscape state, displaying the program icon of the second application program in the first auxiliary display region.

7. The method according to claim 1, wherein, after displaying the program icon of the second application program in the first auxiliary display region, the method further comprises:

when a second sliding signal on the first auxiliary display region is received, cancelling displaying of the program icon of the second application program in the auxiliary display region following the second sliding signal on the first auxiliary display region and further displaying a program icon of a third application program.

8. A smart phone, comprising:
a screen comprising a main display region and an auxiliary display region;
a processor;
a memory for storing instructions executable by the processor;
wherein the processor is configured to:
control the smart phone to display a first user interface for a first application program in the main display region;
control the smart phone to display a program icon of a second application program in the auxiliary display region;

wherein the processor is further configured to, when a first operation signal on the program icon is received, control the smart phone to display a floating window on the first user interface, wherein the floating window is used to display a second user interface for the second application program, wherein a move button is further displayed in the floating window;

wherein the auxiliary display region comprises a first auxiliary display region and a second auxiliary display region, the first auxiliary display region located on an opposite side of a notch of a display screen of the smart phone from the second auxiliary display region, wherein the first auxiliary display region comprises a first long side, a first short side, a second long side and a second short side which are connected in sequence;

wherein the processor is further configured to:
display a shortcut function icon of a first shortcut function in the second auxiliary display region;

wherein the program icon of a second application program is displayed in the first auxiliary display region, and when a first sliding signal on the first auxiliary display region is received, displaying the program icon of the second application program on the auxiliary display region;

wherein the first sliding signal is a signal indicating sliding from the first long side to the second long side, and a distance between the first long side and the main display region is greater than a distance between the second long side and the main display region;

when a fourth operation signal on the move button is received, changing a display position of the floating window in the main display region according to the fourth operation signal.

9. The smart phone according to claim 8, wherein the processor is further configured to:
control the smart phone to display the floating window by superimposing the floating window on a partial area of the first user interface, wherein a distance between the partial area and the auxiliary display region is smaller than a preset distance.

10. The smart phone according to claim 9, wherein a full-screen button is further displayed in the floating window;
wherein the processor is further configured to, when a third operation signal on the full-screen button is received, control the smart phone to display the second user interface for the second application program in a full-screen mode in the main display region.

11. The smart phone according to claim 8, wherein the processor is further configured to:
when the first sliding signal on the first auxiliary display region is received, displaying the program icon of the second application program on the auxiliary display region;
when a second sliding signal on the first auxiliary display region is received, cancel displaying of the program icon of the second application program in the first auxiliary display region following the second sliding signal on the first auxiliary display region and further display a program icon of a third application program.

12. The smart phone according to claim 8, wherein the processor is further configured to:

when a third sliding signal on the first auxiliary display region is received, cancel displaying of the program icon of the second application program in the first auxiliary display region.

13. The smart phone according to claim 8, wherein the processor is further configured to:

when the second application program receives a message of a predetermined type, control the smart phone to display a message pop-up window for the message in the main display region; and after a fifth operation signal on the message pop-up window is received, control the smart phone to display a floating window on the first user interface, wherein the floating window is used to display a message interface for the second application program.

14. The smart phone according to claim 13, wherein the processor is further configured to:

when a fourth sliding signal on the message pop-up window is received, cancel displaying of the message pop-up window.

15. The smart phone according to claim 14, wherein the fourth sliding signal is a signal indicating sliding from a central area of the message pop-up window to an outside of the message pop-up window.

\* \* \* \* \*